(12) United States Patent
Gehlsen et al.

(10) Patent No.: US 6,797,371 B1
(45) Date of Patent: Sep. 28, 2004

(54) ARTICLES THAT INCLUDE A POLYMER FOAM AND METHOD FOR PREPARING SAME

(75) Inventors: Mark D. Gehlsen, Eagan, MN (US); Bradley S. Momchilovich, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 81 days.

(21) Appl. No.: 09/714,658

(22) Filed: Nov. 16, 2000

Related U.S. Application Data

(63) Continuation of application No. PCT/US99/17344, filed on Jul. 30, 1999, which is a continuation-in-part of application No. 09/127,774, filed on Jul. 31, 1998, now Pat. No. 6,103,152.

(51) Int. Cl.$^7$ .............................. B32B 7/12; B32B 3/26
(52) U.S. Cl. .............................. 428/317.5; 428/305.5; 428/313.3; 428/313.5; 428/316.6
(58) Field of Search .................... 428/305.5, 313.3, 428/313.5, 316.6, 317.5

(56) References Cited

U.S. PATENT DOCUMENTS

| | | | |
|---|---|---|---|
| 2,866,722 A | 12/1958 | Gensel et al. .............. 117/104 |
| 2,956,904 A | 10/1960 | Hendricks ................... 117/93 |
| RE24,906 E | 12/1960 | Ulrich | |
| 3,565,247 A | 2/1971 | Brochman ................... 206/59 |
| 3,615,972 A | 10/1971 | Morehouse et al. .......... 156/79 |
| 3,864,181 A | 2/1975 | Wolinski et al. ............. 156/79 |
| 3,932,328 A | 1/1976 | Korpman ............... 260/27 BB |
| 4,005,033 A | * 1/1977 | Georgeau et al. ........ 260/2.5 B |
| 4,223,067 A | 9/1980 | Levens ....................... 428/308 |
| 4,287,308 A | 9/1981 | Nakayama et al. .......... 521/53 |
| 4,415,615 A | 11/1983 | Esmay et al. ................ 428/40 |
| 4,496,620 A | * 1/1985 | Park et al. ................... 428/323 |
| 4,610,923 A | 9/1986 | Schrock ................... 428/304.4 |
| 4,618,525 A | 10/1986 | Chamberlain et al. ...... 428/209 |
| 4,710,536 A | 12/1987 | Klingen et al. ............. 524/493 |
| 4,749,590 A | 6/1988 | Klingen et al. ............. 427/54.1 |
| 4,818,610 A | 4/1989 | Zimmerman et al. ....... 428/345 |
| 4,833,193 A | * 5/1989 | Sieverding ................. 524/486 |
| 4,855,170 A | 8/1989 | Darvell et al. ................ 428/40 |
| 4,906,421 A | 3/1990 | Plamthottam et al. ........ 264/22 |
| 4,921,739 A | 5/1990 | Cascino ....................... 428/40 |
| 4,950,537 A | 8/1990 | Vesley et al. ................ 428/345 |
| 4,960,802 A | 10/1990 | DiStefano .................... 521/72 |
| 5,024,880 A | 6/1991 | Veasley et al. ............. 428/317.5 |
| 5,086,088 A | 2/1992 | Kitano et al. ................ 522/170 |
| 5,100,728 A | 3/1992 | Plamthottam et al. ....... 428/345 |
| 5,115,103 A | 5/1992 | Yamanishi et al. ........... 174/24 |
| 5,132,061 A | * 7/1992 | Lindeman et al. .......... 264/45.3 |
| 5,151,327 A | 9/1992 | Nishiyama et al. .......... 428/343 |
| 5,234,757 A | 8/1993 | Wong ......................... 428/311.1 |
| 5,264,278 A | 11/1993 | Mazurek .................... 428/317.3 |
| 5,296,547 A | 3/1994 | Nestegard et al. | |
| 5,342,858 A | 8/1994 | Litchholt et al. ............. 521/98 |
| 5,441,810 A | 8/1995 | Aizawa et al. .............. 428/354 |
| 5,476,712 A | 12/1995 | Hartman et al. ............. 428/317 |
| 5,507,464 A | 4/1996 | Hamerski et al. | |
| 5,514,122 A | 5/1996 | Morris et al. ............... 604/387 |
| 5,605,717 A | 2/1997 | Simmons et al. .......... 427/208.2 |
| 5,609,954 A | 3/1997 | Aizawa et al. ............ 428/317.5 |
| 5,645,764 A | * 7/1997 | Angelopoulos et al. ...... 252/500 |
| 5,650,215 A | * 7/1997 | Mazurek et al. ............ 428/156 |
| 5,695,837 A | 12/1997 | Everaerts ................... 428/40.1 |
| 5,783,272 A | 7/1998 | Wong ......................... 428/35.7 |
| 5,897,930 A | * 4/1999 | Calhoun et al. ............ 428/41.8 |
| 6,017,624 A | 1/2000 | Delgado et al. ............ 428/355 |

FOREIGN PATENT DOCUMENTS

| | | | |
|---|---|---|---|
| CA | 747341 | 11/1966 | |
| DE | 195 27 926 A1 | 7/1995 | |
| DE | 195 31 631 | 3/1997 | |
| DE | 197 30 854 A1 | 1/1999 | |
| EP | 0 206 760 | 12/1986 | |
| EP | 0 084 220 | 1/1987 | |
| EP | 0 222 680 | 5/1987 | |
| EP | 0 324 242 | 7/1989 | |
| EP | 0 349 216 | 1/1990 | |
| EP | 0 567 837 | 11/1993 | |
| EP | 0 575 012 | 12/1993 | |
| EP | 0 710 696 | 5/1996 | |
| EP | 0 717 091 | 6/1996 | |
| EP | 0 763 585 | 9/1996 | |
| JP | SHO 60 76583 | 1/1985 | |
| JP | HEI 5 194921 | 8/1993 | |
| JP | 10-168401 | 6/1998 | ............ C09J/7/02 |
| WO | WO 93/07228 | 4/1993 | |
| WO | WO 95/16754 | 6/1995 | |
| WO | WO 95/25774 | 9/1995 | |
| WO | WO 96/14366 | 5/1996 | |
| WO | WO 96/38285 | 12/1996 | |
| WO | WO 98/15298 | 4/1998 | .......... A61L/15/58 |
| WO | WO 99/03943 | 1/1999 | |

OTHER PUBLICATIONS

English translation of JP 62087858.*
Derwent Abstract of JP 09328662 A.*
Cusdin, "*What Plate Thickness Really Works Best*", FLEXO, pp. 90–95, Mar. 1997.
Dahl, "*The FQC Plate Construction Project*", FLEXO, pp. 32–40, Nov. 1996.
Abstract Japan 08067861, Mar. 12, 1996.
Cobbs, W., "Foaming of Hot Melts", pp. 103–115.
D. Klempher and K.C.Frisch, Handbook of Polymeric Foams and Foam Technology, pp. 229–233, 1991, Hanser Pub., New York, NY.

* cited by examiner

*Primary Examiner*—Daniel Zirker
*Assistant Examiner*—Victor S. Chang
(74) *Attorney, Agent, or Firm*—Jean A. Lown; Harold C. Knecht, III

(57) ABSTRACT

Polymer foam articles prepared by melt-mixing a polymer composition and a plurality of microspheres, at least one of which is an expandable polymeric microsphere, under process conditions, including temperature and shear rate, selected to form an expandable extrudable composition; and extruding the composition through a die.

26 Claims, 13 Drawing Sheets

ARTICLES THAT INCLUDE A POLYMER FOAM AND METHOD FOR PREPARING SAME

RELATED APPLICATIONS

The present application is a continuation of International Application PCT/US99/17344, having an international filing date of Jul. 30, 1999, which is a continuation-in-part and which claims priority to U.S. patent application Ser. No. 09/127,774, filed Jul. 31, 1998, now U.S. Pat. No. 6,103,152, issued Aug. 15, 2000, all of which are assigned to the assignee of the present application.

FIELD OF THE INVENTION

This invention relates to preparing articles that include a polymer foam.

BACKGROUND OF THE INVENTION

Articles incorporating a polymer foam core are known. The foam includes a polymer matrix and is characterized by a density that is lower than the density of the polymer matrix itself. Density reduction is achieved in a number of ways, including through creation of gas-filled voids in the matrix (e.g., by means of a blowing agent) or inclusion of polymeric microspheres (e.g., expandable microspheres) or non-polymeric microspheres (e.g., glass microspheres).

SUMMARY OF THE INVENTION

In a first aspect, the invention features an article that includes a polymer foam having a substantially smooth surface. The foam may be provided in a variety of shapes, including a rod, a cylinder, a sheet, etc. In some embodiments, e.g., where the foam is provided in the form of a sheet, the foam has a pair of major surfaces, one or both of which are substantially smooth. The foam includes a plurality of microspheres, at least one of which is an expandable polymeric microsphere.

As used herein, a "polymer foam" refers to an article that includes a polymer matrix in which the density of the article is less than the density of the polymer matrix alone.

A "substantially smooth" surface refers to a surface having an Ra value less than about 75 micrometers, as measured by laser triangulation profilometry according to the procedure described in the Examples, infra. Preferably, the surface has an Ra value less than about 50 micrometers, more preferably less than about 25 micrometers. The surface is also characterized by the substantial absence of visually observable macroscopic defects such as wrinkles, corrugations and creases. In addition, in the case of an adhesive surface, the surface is sufficiently smooth such that it exhibits adequate contact and, thereby, adhesion to a substrate of interest. The desired threshold level of adhesion will depend on the particular application for which the article is being used.

An "expandable polymeric microsphere" is a microsphere that includes a polymer shell and a core material in the form of a gas, liquid, or combination thereof, that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The article may be an adhesive article or a non-adhesive article. An "adhesive article" is an article having a surface available for bonding that is either tacky at room temperature (i.e., pressure sensitive adhesive articles) or becomes tacky when heated (i.e., heat-activated adhesive articles). An example of an adhesive article is a foam that itself is an adhesive, or an article that includes one or more separate adhesive compositions bonded to the foam, e.g., in the form of a continuous layer or discrete structures (e.g., stripes, rods, filament, etc.), in which case the foam itself need not be an adhesive. Examples of non-adhesive articles include non-adhesive foams and adhesive foams provided with a non-adhesive composition, e.g., in the form of a layer, substrate, etc., on all surfaces available for bonding.

The foam preferably is substantially free of urethane crosslinks and urea crosslinks, thus eliminating the need for isocyanates in the composition. An example of a preferred material for the polymer foam is an acrylic polymer or copolymer. In some cases, e.g., where high cohesive strength and/or high modulus is needed, the foam may be crosslinked.

The polymer foam preferably includes a plurality of expandable polymeric microspheres. The foam may also include one or more non-expandable microspheres, which may be polymeric or non-polymeric microspheres (e.g., glass microspheres).

Examples of preferred expandable polymeric microspheres include those in which the shell is essentially free of vinylidene chloride units. Preferred core materials are materials other than air that expand upon heating.

The foam may contain agents in addition to microspheres, the choice of which is dictated by the properties needed for the intended application of the article. Examples of suitable agents include those selected from the group consisting of tackifiers, plasticizers, pigments, dyes, solid fillers, and combinations thereof. The foam may also include gas-filled voids in the polymer matrix. Such voids typically are formed by including a blowing agent in the polymer matrix material and then activating the blowing agent, e.g., by exposing the polymer matrix material to heat or radiation.

The properties of the article may be adjusted by bonding and/or co-extruding one or more polymer compositions (e.g., in the form of continuous layers or discrete structures such as stripes, rods, filament, etc.) to or into the foam. Both foamed and non-foamed compositions may be used. A composition may be bonded directly to the foam or indirectly, e.g., through a separate adhesive.

The article may be used as a "foam-in-place" article. The term foam-in-place refers to the ability of the article to be expanded or further expanded after the article has been placed at a desired location. Such articles are sized and placed in a recessed area or on an open surface, and then exposed to heat energy (e.g., infrared, ultrasound, microwave, resistive, induction, convection, etc.) to activate, or further activate, the expandable microspheres or blowing agent. Such recessed areas can include a space between two or more surfaces (e.g., parallel or non-parallel surfaces) such as found, for example, between two or more opposing and spaced apart substrates, a through hole or a cavity. Such open surfaces can include a flat or uneven surface on which it is desirable for the article to expand after being applied to the surface. Upon activation, the foam expands due to the expansion of the microspheres and/or blowing agent, thereby partially or completely filling the recess or space, or thereby increasing the volume (e.g. height) of the article above the open surface.

It can be desirable for the foam to comprise a substantially uncrosslinked or thermoplastic polymeric matrix material. It can also be desirable for the matrix polymer of the foam to exhibit some degree of crosslinking. Any crosslinking should not significantly inhibit or prevent the foam from expanding to the degree desired. One potential advantage to such crosslinking is that the foam will likely exhibit improved mechanical properties (e.g., increase cohesive strength) compared to the same foam with less or no crosslinking. In the case of foams having a curable polymer matrix, exposure to heat can also initiate cure of the matrix.

It can further be desirable for the foam-in-place article to comprise multiple layers, 10 discrete structures or a combination thereof (See, for example, FIGS. 4–6 and the below discussion thereof), with each layer and discrete structure having a difference in the way it foams-in-place (e.g., using expandable microspheres, blowing agents or a combination thereof), a difference in the degree to which it can be expanded in place, or a combination thereof. For example, the concentration of expandable microspheres and/or blowing agents can be different, the type of expandable microspheres and/or blowing agents can be different, or a combination thereof can be used. In addition, for example, one or more of the layers and discrete structures can be expandable in place while one or more other layers and discrete structures can be unexpandable in place.

In a second aspect, the invention features an article (e.g., an adhesive article, as defined above) comprising a polymer foam (as defined above) that includes: (a) a plurality of microspheres, at least one of which is an expandable polymeric microsphere (as defined above), and (b) a polymer matrix that is substantially free of urethane crosslinks and urea crosslinks. The matrix includes a blend of two or more polymers in which at least one of the polymers in the blend is a pressure sensitive adhesive polymer (i.e., a polymer that is inherently pressure sensitive, as opposed to a polymer which must be combined with a tackifier in order to form a pressure sensitive composition) and at least one of the polymers is selected from the group consisting of unsaturated thermoplastic elastomers, acrylate-insoluble saturated thermoplastic elastomers, and non-pressure sensitive adhesive thermoplastic polymers.

The foam preferably has a substantially smooth surface (as defined above). In some embodiments, the foam has a pair of major surfaces, one or both of which may be substantially smooth. The foam itself may be an adhesive. The article may also include one or more separate adhesive compositions bonded to the foam, e.g., in the form of a layer. If desired, the foam may be crosslinked.

The polymer foam preferably includes a plurality of expandable polymeric microspheres. It may also include non-expandable microspheres, which may be polymeric or non-polymeric microspheres (e.g., glass microspheres). The properties of the article may be adjusted by directly or indirectly bonding one or more foamed or non-foamed polymer compositions to the foam.

The invention also features multi-layer articles that include the above-described foam articles provided on a major surface of a first substrate, or sandwiched between a pair of substrates. Examples of suitable substrates include wood substrates, synthetic polymer substrates, and metal substrates (e.g., metal foils).

In a third aspect, the invention features a method for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; (b) extruding the composition through a die to form a polymer foam (as defined above); and (c) at least partially expanding one or more expandable polymeric microspheres before the polymer composition exits the die. It can be preferable for most, if not all, of the expandable microspheres to be at least partially expanded before the polymer composition exits the die. By causing expansion of the expandable polymeric microspheres before the composition exits the die, the resulting extruded foam can be produced to within tighter tolerances, as described below in the Detailed Description.

It is desirable for the polymer composition to be substantially solvent-free. That is, it is preferred that the polymer composition contain less than 20 wt. % solvent, more preferably, contain substantially none to no greater than about 10 wt. % solvent and, even more preferably, contain no greater than about 5 wt. % solvent.

In a fourth aspect, the invention features another method for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; and (b) extruding the composition through a die to form a polymer foam (as defined above). After the polymer foam exits the die, enough of the expandable polymeric microspheres in the foam remain unexpanded or, at most, partially expanded to enable the polymer foam to be used in a foam-in-place application. That is, the extruded foam can still be further expanded to a substantial degree at some later time in the application. Preferably, the expandable microspheres in the extruded foam retain most, if not all, of their expandability.

In a fifth aspect, the invention features another method for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; and (b) extruding the composition through a die to form a polymer foam (as defined above) having a substantially smooth surface (as defined above). It is also possible to prepare foams having a pair of major surfaces in which one or both major surfaces are substantially smooth.

Polymers used according to the present invention can preferably possess a weight average molecular weight of at least about 10,000 g/mol, and more preferably at least about 50,000 g/mol. It can also be preferable for the polymers used according to the present invention to exhibit shear viscosities measured at a temperature of 175° C. and a shear rate of 100 sec$^{-1}$, of at least about 30 Pascal-seconds (Pa-s), more preferably at least about 100 Pa-s and even more preferably at least about 200 Pa-s.

The article may be an adhesive article (as defined above), e.g., a pressure sensitive adhesive article or a heat-activated adhesive article. In some embodiments, the foam itself is an adhesive.

Both the expandable extrudable composition and the extruded foam preferably include a plurality of expandable polymeric microspheres (as defined above). The extruded foam and the expandable extrudable composition may also include one or more non-expandable microspheres, which may be polymeric or non-polymeric microspheres (e.g., glass microspheres).

The expandable extrudable composition may be co-extruded with one or more additional extrudable polymer compositions, e.g., to form a polymer layer on a surface of the resulting foam. For example, the additional extrudable polymer composition may be an adhesive composition. Other suitable additional extrudable polymer compositions include additional microsphere-containing compositions.

The method may also include crosslinking the foam. For example, the foam may be exposed to thermal, actinic, or ionizing radiation or combinations thereof subsequent to extrusion to crosslink the foam. Crosslinking may also be accomplished by using chemical crosslinking methods based on ionic interactions.

The invention provides foam-containing articles, and a process for preparing such articles, in which the articles can be designed to exhibit a wide range of properties depending upon the ultimate application for which the article is intended. For example, the foam core may be produced alone or in combination with one or more polymer compositions, e.g., in the form of layers to form multi-layer articles. The ability to combine the foam with additional polymer compositions offers significant design flexibility, as a variety of different polymer compositions may be used, including adhesive compositions, additional foam compositions, removable compositions, layers having different mechanical properties, etc. In addition, through careful control of the foaming operation it is possible to produce a foam having a pattern of regions having different densities.

Both thin and thick foams can be produced. In addition, both adhesive and non-adhesive foams can be produced. In the latter case, the foam may be combined with one or more separate adhesive compositions to form an adhesive article. In addition, it is possible to prepare foams from a number of different polymer matrices, including polymer matrices that are incompatible with foam preparation processes that rely on actinic radiation-induced polymerization of microsphere-containing photopolymerizable compositions. Examples of such polymer matrix compositions include unsaturated thermoplastic elastomers and acrylate-insoluble saturated thermoplastic elastomers. Similarly, it is possible to include additives such as ultraviolet-absorbing pigments (e.g., black pigments), dyes, and tackifiers that could not be used effectively in actinic radiation-based foam processes. It is further possible, in contrast to solvent-based and actinic radiation-based foam processes, to prepare foams having a substantially homogeneous distribution of microspheres. In addition, the present expanded foam (i.e., a foam containing microspheres that have been at least partially expanded) can have a uniform size distribution of the expanded microspheres from the surface to the center of the foam. That is, there is no gradient of expanded microsphere sizes from the surface to the center of the foam, e.g., like that found in expanded foams which are made in a press or a mold. Expanded foams that exhibit such a size distribution gradient of their expanded microspheres can exhibit weaker mechanical properties than such foams that have a uniform size distribution of the expanded microspheres. Oven foaming of these foam compositions require long residence times in the high temperature oven due to the poor thermal conductivity of the foams. Long residence times at high temperatures can lead to polymer and carrier (e.g., release liner) degradation. In addition, poor heat transfer can also lead to foams containing non-uniform expansion, causing a density gradient. Such a density gradient can significantly decrease the strength and otherwise detrimentally impact the properties of the foam. The process associated with oven foaming is also complicated and usually requires unique process equipment to eliminate large scale corrugation and buckling of the planar sheet. For a reference on oven foaming see, for example, *Handbook of Polymeric Foams & Foam Technology*, eds: D. Klempner & K. C. Frisch, Hanser Publishers, New York, N.Y., 1991.

Foams with a substantially smooth surface can be produced in a single step. Accordingly, it is not necessary to bond additional layers to the foam in order to achieve a smooth-surfaced article. Substantially smooth-surfaced foams are desirable for a number of reasons. For example, when the foam is laminated to another substrate, the substantially smooth surface minimizes air entrapment between the foam and the substrate. Moreover, in the case of adhesive foams the substantially smooth surface maximizes contact with a substrate to which the foam is applied, leading to good adhesion.

The extrusion process enables the preparation of multi-layer articles, or articles with discrete structures, in a single step. In addition, when foaming occurs during the extrusion, it is possible, if desired, to eliminate separate post-production foaming processes. Moreover, by manipulating the design of the extrusion die (i.e., the shape of the die opening), it is possible to produce foams having a variety of shapes.

In addition, the present method may include heating the article after extrusion to cause further expansion. The additional expansion may be due to microsphere expansion, activation of a blowing agent, or a combination thereof.

It is also possible to prepare "foam-in-place" articles by controlling the process temperature during the initial foam preparation such that expansion of the microspheres is minimized or suppressed. The article can then be placed at a location of use or application, (e.g., in a recessed area or on an open surface) and heated, or exposed to an elevated temperature to cause microsphere expansion. "Foam-in-place" articles can also be prepared by including a blowing agent in the expandable extrudable composition and conducting the extrusion process under conditions insufficient to activate the blowing agent. Subsequent to foam preparation, the blowing agent can be activated to cause additional foaming.

Other features and advantages of the invention will be apparent from the following description of the preferred embodiments thereof, and from the claims.

BRIEF DESCRIPTION OF THE DRAWINGS

FIG. 1(*b*) is a photomicrograph obtained by scanning electron microscopy (SEM) of the surface of the sample described in Example 12.

FIG. 2(*b*) is a SEM photomicrograph of the surface of the sample described in Example 58.

DETAILED DESCRIPTION

Article

The invention features articles that include a polymer foam featuring a polymer matrix and one or more expandable polymer microspheres. Examination of the foam by electron microscopy reveals that the foam microstructure is characterized by a plurality of enlarged polymeric microspheres (relative to their original size) distributed throughout the polymer matrix. At least one of the microspheres (and preferably more) is still expandable, i.e., upon application of heat it will expand further without breaking. This can be demonstrated by exposing the foam to a heat treatment and comparing the size of the microspheres obtain by electron microscopy to their pre-heat treated size (also obtained by electron microscopy).

Figure 1A:
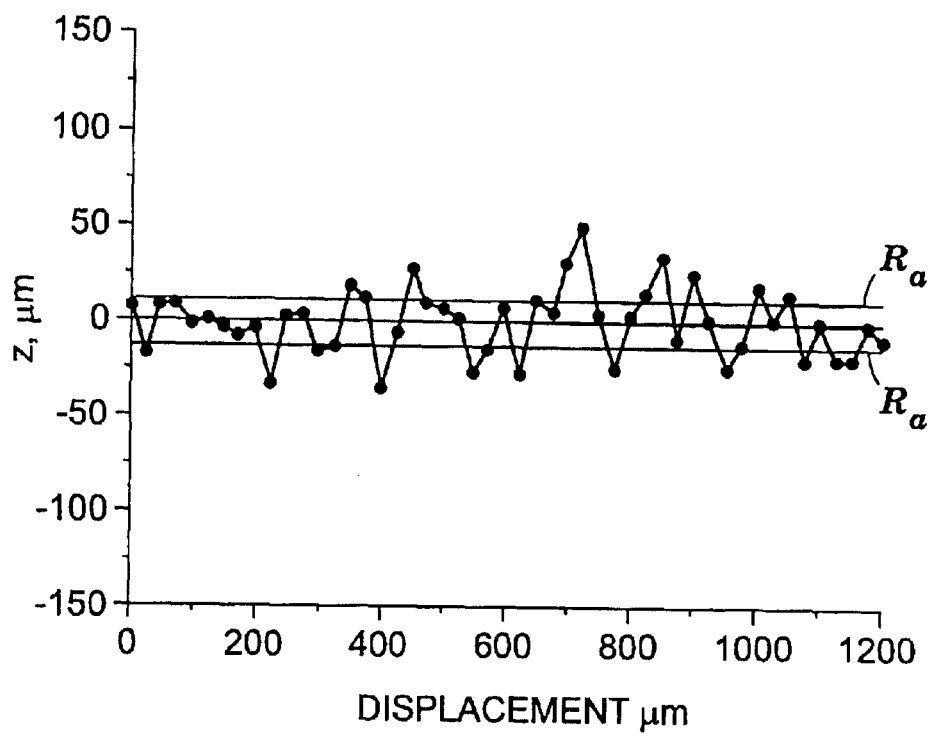
FIG. 1(*a*) is a plot showing the Ra value obtained by laser triangulation profilometry for the sample described in Example 12.
Figure 2A:
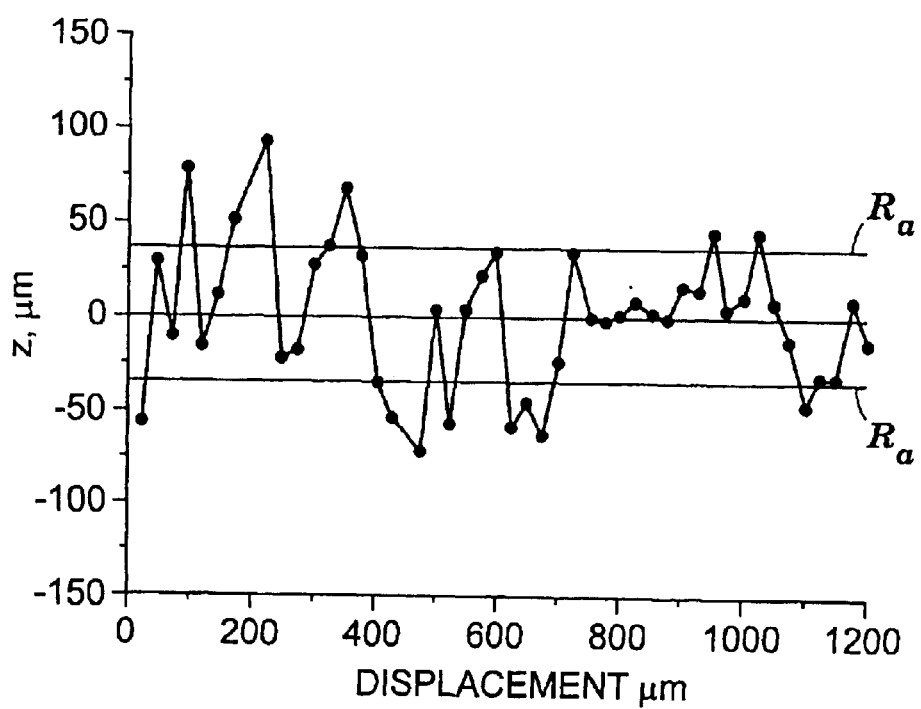
FIG. 2(*a*) is a plot showing the Ra value obtained by laser triangulation profilometry for the sample described in Example 58.
Figure 1B:
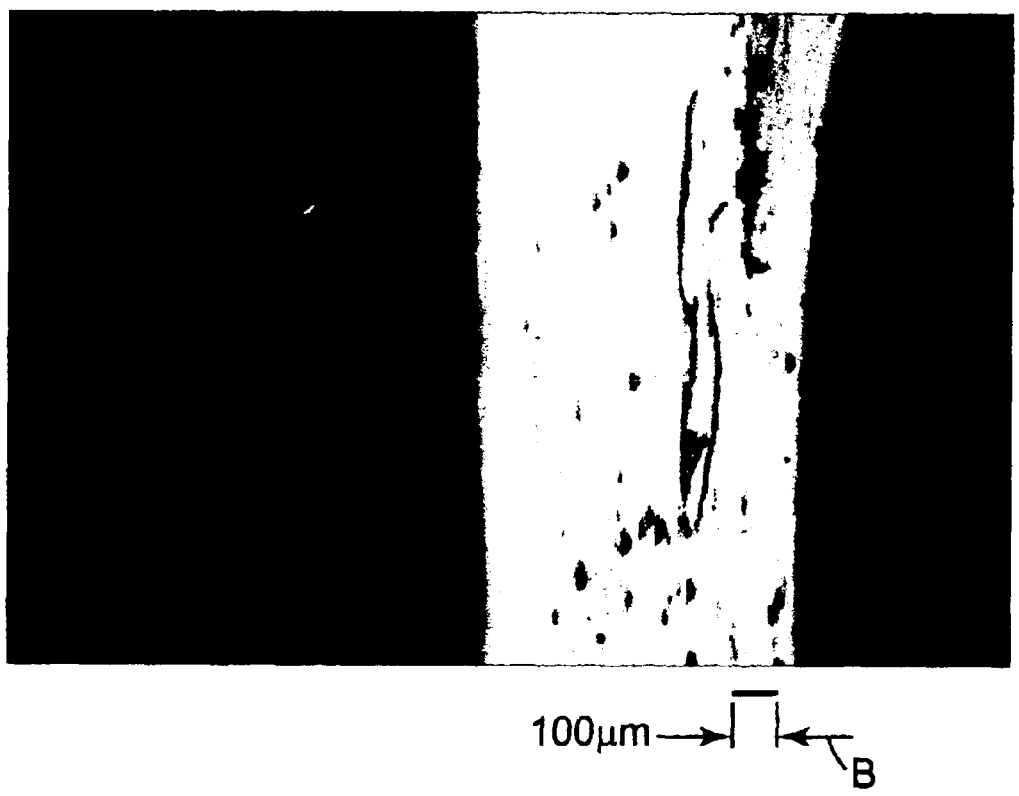
Figure 2B:
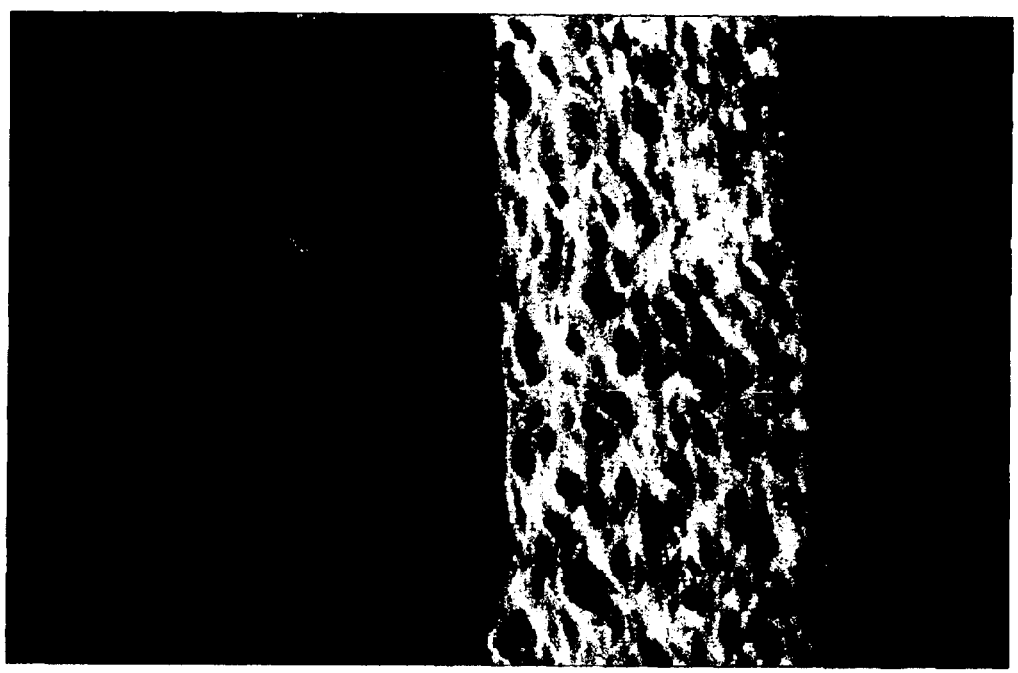

The foam is further characterized by a surface that is substantially smooth, as defined in the Summary of the Invention, above. Laser triangulation profilometry results and scanning electron photomicrographs are shown in FIGS. 1 and 2 for representative acrylic foams having substantially smooth surfaces prepared as described in Examples 12 and 58, respectively, described in further detail below. Each of the photomicrographs of FIGS. 1(b) and 2(b) includes a 100 micrometer long measurement bar B. Each of the samples in FIGS. 1(b) and 2(b) have been sectioned, with the surface portion being light and the sectioned portion being dark.

Figure 3:
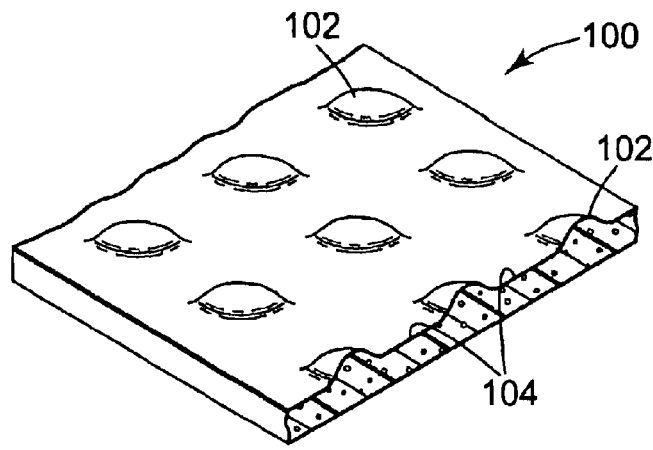
FIG. 3 is a perspective drawing showing a foam having a patterned surface.

The foam may be provided in a variety of forms, including a sheet, rod, or cylinder. In addition, the surface of the foam may be patterned. An example of such a foam is shown in FIG. 3. Foam 100 is in the form of a sheet having a uniform pattern of bumps 102 arranged on the surface of the foam. Such articles are prepared by differential foaming, as described in more detail, below. The differential foaming process creates bumps 102 having a density different from the density of the surrounding areas 104.

A variety of different polymer resins, as well as blends thereof, may be used for the polymer matrix as long as the resins are suitable for melt extrusion processing. For example, it may be desirable to blend two or more acrylate polymers having different compositions. A wide range of foam physical properties can be obtained by manipulation of the blend component type and concentration. The particular resin is selected based upon the desired properties of the final foam-containing article. The morphology of the immiscible polymer blend that comprises the foam matrix can enhance the performance of the resulting foam article. The blend morphology can be, for example, spherical, ellipsoidal, fibrillar, co-continuous or combinations thereof. These morphologies can lead to a unique set of properties that are not obtainable by a single component foam system. Such unique properties may include, for example, anisotropic mechanical properties, enhanced cohesive strength. The morphology (shape & size) of the immiscible polymer blend can be controlled by the free energy considerations of the polymer system, relative viscosities of the components, and most notably the processing & coating characteristics. By proper control of these variables, the morphology of the foam can be manipulated to provide superior properties for the intended article.

Figure 13A:
FIGS. 13a and 13b are SEM photomicrographs of cross-sections, as viewed in the machine direction (MD) and crossweb direction (CD), respectively, of the polymer blend foam described in Example 23.
Figure 13B:

FIGS. 13a and 13b show SEM photomicrographs of the microstructure of the immiscible polymer blend of Example 23 (i.e., 80 wt % of the Hot Melt Composition 1 and 20 wt % of Kraton™ D1107). The Kraton™ D1107 was stained with $OSO_4$ so as to appear white, which enables this phase to be viewed. These Figures demonstrate that the Kraton™ D1107 phase is a complex morphology consisting of fibrillar microstructures, with sizes of approximately 1 $\mu$m. In FIG. 13a, the Kraton™ D1107 fibrillar phases are shown in cross-section and appear spherical.

One class of useful polymers includes acrylate and methacrylate adhesive polymers and copolymers. Such polymers can be formed by polymerizing one or more monomeric acrylic or methacrylic esters of non-tertiary alkyl alcohols, with the alkyl groups having form 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl actylate and cyclobenzyl acrylate.

Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates", vinylidene chloride, styrene, vinyl toluene, and alkyl vinyl ethers.

A second group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C. ) and a methoxypolyethylene glycol 400 acrylate (Tg=−65° C.; available from Shin Nakamura Chemical Co., Ltd. under the designation "NK Ester AM-90G").

A second class of polymers useful for the polymer matrix of the foam includes acrylate-insoluble polymers. Examples include semicrystalline polymer resins such as polyolefins and polyolefin copolymers (e.g., based upon monomers having between 2 and 8-carbon atoms such as low density polyethylene, high density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate. Other examples of acrylate-insoluble polymers include amorphous polymers having a solubility parameter (as measured according to the Fedors' technique) less than 8 or greater than 11 such as polyacrylonitrile, polyvinyl chloride, thermoplastic polyurethanes, aromatic epoxies, polycarbonate, amorphous polyesters, amorphous polyamides, ABS copolymers, polyphenylene oxide alloys, ionomers (e.g., ethylene-methacrylic acid copolymers neutralized with salt), fluorinated elastomers, and polydimethyl siloxane.

A third class of polymers useful for the polymer matrix of the foam includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber.

A fourth class of polymers useful for the polymer matrix of the foam includes pressure sensitive and hot melt adhesives prepared from non-photopolymerizable monomers. Such polymers can be adhesive polymers (i.e., polymers that are inherently adhesive), or polymers that are not inherently adhesive but are capable of forming adhesive compositions when compounded with tackifiers. Specific examples include poly-alpha-olefins (e.g., polyoctene, polyhexene, and atactic polypropylene), block copolymer-based adhesives (e.g., di-block, tri-block, star-block and combinations thereof), natural and synthetic rubbers, silicone adhesives, ethylene-vinyl acetate, and epoxy-containing structural adhesive blends (e.g., epoxy-acrylate and epoxy-polyester blends).

The expandable microspheres feature a flexible, thermoplastic, polymeric shell and a core that includes a liquid and/or gas which expands upon heating. Preferably, the core material is an organic substance that has a lower boiling point than the softening temperature of the polymeric shell. Examples of suitable core materials include propane, butane, pentane, isobutane, neopentane, and combinations thereof.

The choice of thermoplastic resin for the polymeric shell influences the mechanical properties of the foam. Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density articles.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres having essentially no vinylidene chloride units.

Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations "Expancel 551," "Expancel 461," and "Expancel 091." Each of these microspheres features an acrylonitrile-containing shell. In addition, the F80SD, F100D, and Expancel 091 microspheres have essentially no vinylidene chloride units in the shell.

The amount of expandable microspheres is selected based upon the desired properties of the foam product. In general, the higher the microsphere concentration, the lower the density of the foam. In general, the amount of microspheres ranges from about 0.1 parts by weight to about 50 parts by weight (based upon 100 parts of polymer resin), more preferably from about 0.5 parts by weight to about 20 parts by weight.

The foam may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. Chemical blowing agents may be added as well. The agents are added in amounts sufficient to obtain the desired end properties.

The properties of the article may be adjusted by combining one or more polymer compositions with the foam. These additional compositions may take several forms, including layers, stripes, etc. Both foamed and non-foamed compositions may be used. A composition may be bonded directly to the foam or indirectly, e.g., through a separate adhesive. In some embodiments, the additional polymer composition is removably bonded to the foam; such compositions can subsequently be stripped from the foam.

Figure 4:
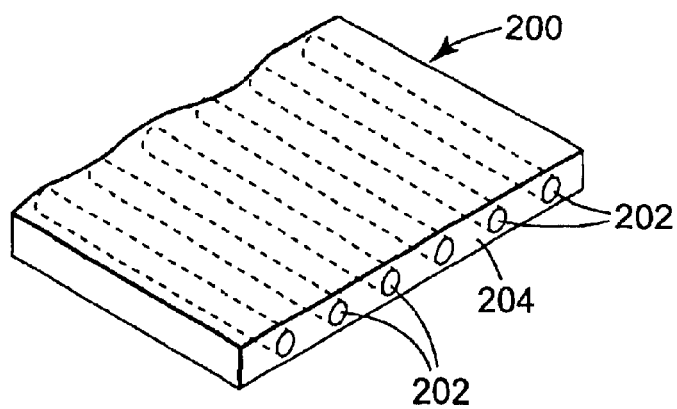
FIG. 4 is a perspective drawing of an article featuring a foam combined with an additional polymer composition.
Figure 5:
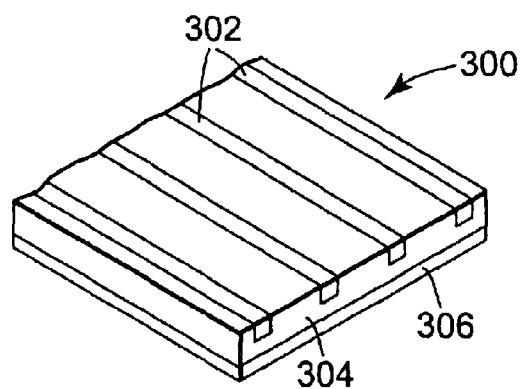
FIG. 5 is a perspective drawing of an article featuring a foam combined with two additional polymer compositions.
Figure 6:
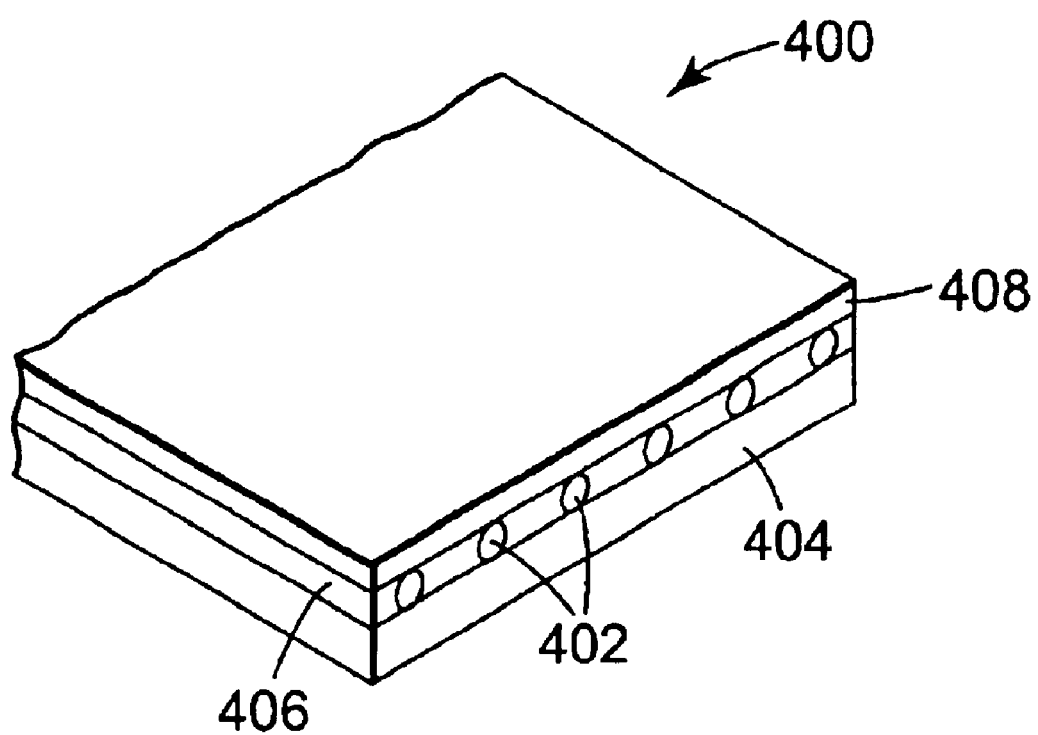
FIG. 6 is a perspective drawing of an article featuring a foam combined with multiple additional polymer compositions.

Examples of articles featuring combinations of a foam and one or more additional polymer compositions are shown in FIGS. 4–6. Referring to FIG. 4, there is shown an article 200 featuring a plurality of foam stripes 202 arranged in a patterned and combined within a separate polymer layer 204. The density of stripes 202 is different from the density of polymer layer 204 surrounding the stripes.

FIG. 5 depicts another article 300 in which a plurality of foam stripes 302 are arranged in a pattern and combined within a separate polymer layer 304. Layer 304, in turn, is bonded to yet another polymer layer 306 on its opposite face. The density of stripes 302 is different from the density of layer 304 surrounding the stripes.

FIG. 6 depicts yet another article 400 in which a plurality of foam stripes 402 are embedded within a multilayer structure featuring polymer layers 404, 406, and 408. The density of stripes 402 is different from the density of layers 404, 406, and 408.

Preferably, additional polymer compositions are bonded to the foam core by co-extruding the extrudable microsphere-containing composition with one or more extrudable polymer compositions, as described in greater detail, below. The number and type of polymer compositions are selected based upon the desired properties of the final foam-containing article. For example, in the case of non-adhesive foam cores, it may be desirable to combine the core with one or more adhesive polymer compositions to form an adhesive article. Other examples of polymer compositions prepared by co-extrusion include relatively high modulus polymer compositions for stiffening the article (semi-crystalline polymers such as polyamides and polyesters), relatively low modulus polymer compositions for increasing the flexibility of the article (e.g., plasticized polyvinyl chloride), and additional foam compositions.

Extrusion Process

Figure 7:
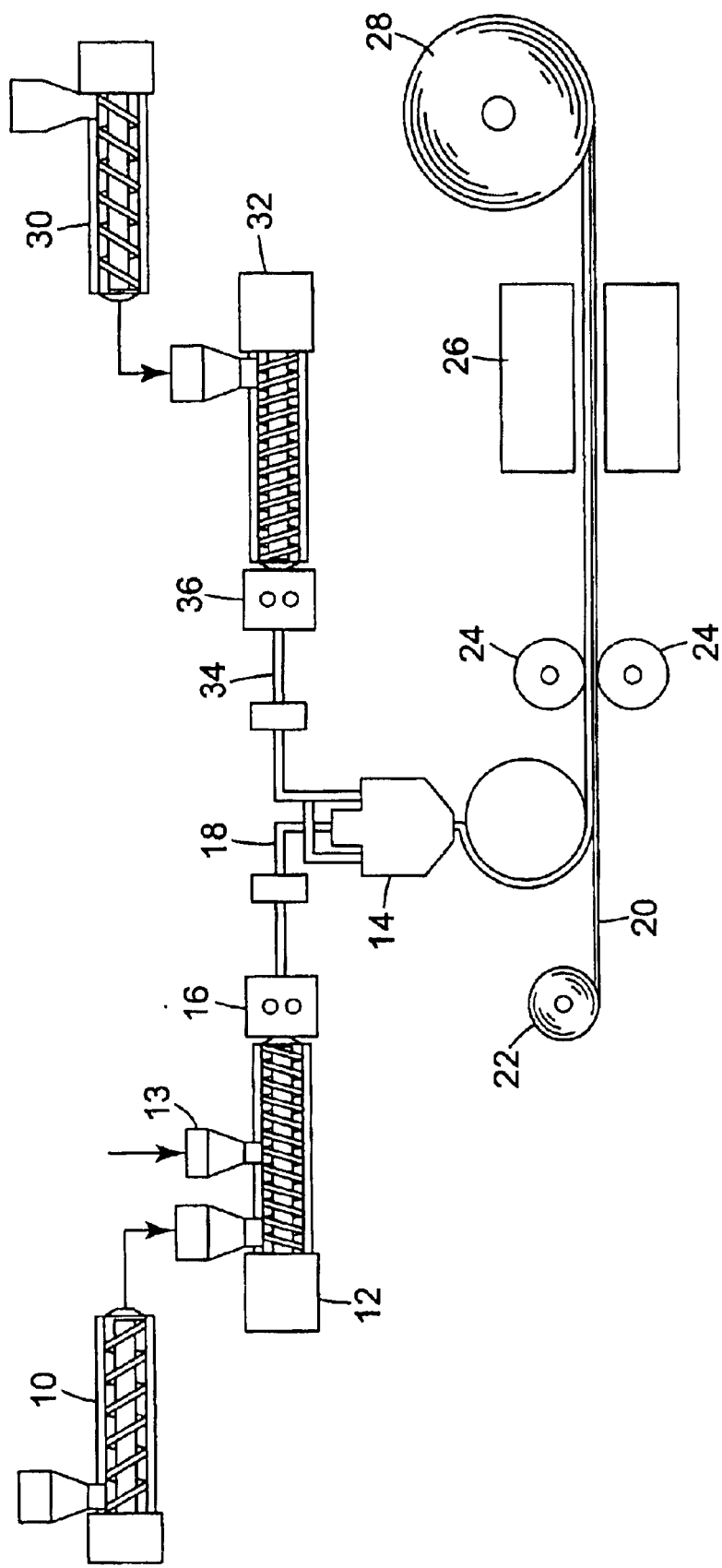
FIG. 7 is a schematic drawing of an extrusion process for preparing articles according to the invention.

Referring to FIG. 7, there is shown an extrusion process for preparing an article that includes a polymer foam featuring a polymer matrix and one or more expandable polymer microspheres. According to the process, polymer resin is initially fed into a first extruder 10 (typically a single screw extruder) which softens and grinds the resin into small particles suitable for extrusion. The polymer resin will eventually form the polymer matrix of the foam. The polymer resin may be added to extruder 10 in any convenient form, including pellets, billets, packages, strands, and ropes.

Next, the resin particles and all additives except the expandable microspheres are fed to a second extruder 12 (e.g., a single or twin screw extruder) at a point immediately prior to the kneading section of the extruder. Once combined, the resin particles and additives are fed to the kneading zone of extruder 12 where they are mixed well. The mixing conditions (e.g., screw speed, screw length, and temperature) are selected to achieve optimum mixing. Preferably, mixing is carried out at a temperature insufficient to cause microsphere expansion. It is also possible to use temperatures in excess of the microsphere expansion temperature, in which case the temperature is decreased following mixing and prior to adding the microspheres.

Where no mixing is needed, e.g., where there are no additives, the kneading step may be omitted. In addition, where the polymer resin is already in a form suitable for extrusion, the first extrusion step may be omitted and the resin added directly to extruder 12.

Once the resin particles and additives have been adequately mixed, expandable polymeric microspheres are added to the resulting mixture and melt-mixed to form an expandable extrudable composition. The purpose of the melt-mixing step is to prepare an expandable extrudable composition in which the expandable polymeric microspheres and other additives, to the extent present, are distributed substantially homogeneously throughout the molten polymer resin. Typically, the melt-mixing operation uses one kneading block to obtain adequate mixing, although simple conveying elements may be used as well. The temperature, pressure, shear rate, and mixing time employed during melt-mixing are selected to prepare this expandable extrudable composition without causing the microspheres to expand or break; once broken, the microspheres are unable to expand to create a foam. Specific temperatures, pressures, shear rates, and mixing times are selected based upon the particular composition being processed.

Following melt-mixing, the expandable extrudable composition is metered into extrusion die 14 (e.g., a contact or drop die) through a length of transfer tubing 18 using a gear pump 16 that acts as a valve to control die pressure and thereby prevent premature expansion of the microspheres. The temperature within die 14 is preferably maintained at substantially the same temperature as the temperature within transfer tubing 18, and selected such that it is at or above the temperature required to cause expansion of the expandable microspheres. However, even though the temperature within tubing 18 is sufficiently high to cause microsphere expansion, the relatively high pressure within the transfer tubing prevents them from expanding. Once the composition enters die 14, however, the pressure drops. The pressure drop, coupled with heat transfer from the die, causes the microspheres to expand and the composition to foam within the die. The pressure within the die continues to drop further as the composition approaches the exit, further contributing to microsphere expansion within the die. The flow rate of polymer through the extruder and the die exit opening are maintained such that as the polymer composition is processed through the die, the pressure in the die cavity remains sufficiently low to allow expansion of the expandable microspheres before the polymer composition reaches the exit opening of the die.

The shape of the foam is dictated by the shape of the exit opening of the die 14. Although a variety of shapes may be produced, the foam is typically produced in the form of a continuous or discontinuous sheet. The extrusion die may be a drop die, contact die, profile die, annular die, or a casting die, for example, as described in *Extrusion Dies: Design & Engineering Computation*, Walter Michaelis, Hanser Publishers, New York, N.Y., 1984, which is incorporated herein by reference in its entirety.

It can be preferable for most, if not all, of the expandable microspheres to be partially or mostly expanded before the polymer composition exits the die. By causing expansion of the expandable polymeric microspheres before the composition exits the die, the resulting extruded foam can be produced to within tighter density and thickness (caliper) tolerances. A tighter tolerance is defined as the machine (or longitudinal) direction and crossweb (or transverse) direction standard deviation of density or thickness over the average density or thickness ($\sigma/x$), respectively. The $\sigma/x$ that is obtainable according to the present invention can be less than about 0.2, less than about 0.1, less than about 0.05, and even less than about 0.025. Without any intention to be so limited, the tighter tolerances obtainable according to the present invention is evidenced by the following examples.

As shown in FIG. 7, the foam may optionally be combined with a liner 20 dispensed from a feed roll 22. Suitable materials for liner 20 include silicone release liners, polyester films (e.g., polyethylene terephthalate films), and polyolefin films (e.g., polyethylene films). The liner and the foam are then laminated together between a pair of nip rollers 24.

Following lamination or after being extruded but before lamination, the foam is optionally exposed to radiation from an electron beam source 26 to crosslink the foam; other sources of radiation (e.g., ion beam, thermal and ultraviolet radiation) may be used as well. Crosslinking improves the cohesive strength of the foam. Following exposure, the laminate is rolled up onto a take-up roll 28.

If desired, the smoothness of one or both of the foam surfaces can be increased by using a nip roll to press the foam against a chill roll after the foam exits die 14. It is also possible to emboss a pattern on one or both surfaces of the foam by contacting the foam with a patterned roll after it exits die 14, using conventional microreplication techniques, such as, for example, those disclosed in U.S. Pat. Nos. 5,897,930 (Calhoun et al.), 5,650,215 (Mazurek et al.) and the PCT Patent Publication No. WO 98/29516A (Calhoun et al.), all of which are incorporated herein by reference. The replication pattern can be chosen from a wide range of geometrical shapes and sizes, depending on the desired use of the foam. The substantially smooth surface of the extruded foam enables microreplication of the foam surface to a higher degree of precision and accuracy. Such high quality microreplication of the present foam surface is also facilitated by the ability of the foam to resist being crushed by the pressure exerted on the foam during the microreplication process. Microreplication techniques can be used without significantly crushing the foam because the foam includes expandable microspheres that do not collapse under the pressure of the microreplication roll, compared to foaming agents like gas.

The extrusion process may be used to prepare "foam-in-place" articles. Such articles find application, for example, as gaskets or other gap-sealing articles, vibration damping articles, tape backings, retroreflective sheet backings, anti-fatigue mats, abrasive article backings, raised pavement marker adhesive pads, etc. Foam-in-place articles may be prepared by carefully controlling the pressure and temperature within die 14 and transfer tubing 18 such that microsphere expansion does not occur to any appreciable extent. The resulting article is then placed in a desired area, e.g., a recessed area or open surface and heated at, or exposed to, a temperature sufficiently high to cause microsphere expansion.

Foam-in-place articles can also be prepared by incorporating a chemical blowing agent such as 4,4'-oxybis (benzenesulfonylhydrazide) in the expandable extrudable composition. The blowing agent can be activated subsequent to extrusion to cause further expansion, thereby allowing the article to fill the area in which it is placed.

The extrusion process can also be used to prepare patterned foams having areas of different densities. For example, downstream of the point at which the article exits the die, the article can be selectively heated, e.g., using a patterned roll or infrared mask, to cause microsphere expansion in designated areas of the article.

The foam may also be combined with one or more additional polymer compositions, e.g., in the form of layers, stripes, rods, etc., preferably by co-extruding additional extrudable polymer compositions with the microsphere-containing extrudable compositions. FIG. 7 illustrates one preferred co-extrusion process for producing an article featuring a foam sandwiched between a pair of polymer layers. As shown in FIG. 7, polymer resin is optionally added to a first extruder 30 (e.g., a single screw extruder) where it is softened and melt mixed. The melt mixed resin is then fed to a second extruder 32 (e.g., a single or twin screw extruder) where they are mixed with any desired additives. The resulting extrudable composition is then metered to the appropriate chambers of die 14 through transfer tubing 34 using a gear pump 36. The resulting article is a three-layer article featuring a foam core having a polymer layer on each of its major faces.

It is also possible to conduct the co-extrusion process such that a two-layer article is produced, or such that articles having more than three layers (e.g., 10–100 layers or more) are produced, by equipping die 14 with an appropriate feed block, or by using a multi-vaned or multi-manifold die. Tie layers, primers layers or barrier layers also can be included to enhance the interlayer adhesion or reduce diffusion through the construction. In addition, we also can improve the interlayer adhesion of a construction having multiple layers (e.g., A/B) of different compositions by blending a fraction of the A material into the B layer (A/AB). Depending on the degree of interlayer adhesion will dictate the concentration of A in the B layer. Multilayer foam articles can also be prepared by laminating additional polymer layers to the foam core, or to any of the co-extruded polymer layers after the article exits die 14. Other techniques which can be used include coating the extruded foam (i.e., extrudate) with stripes or other discrete structures.

Figure 12A:
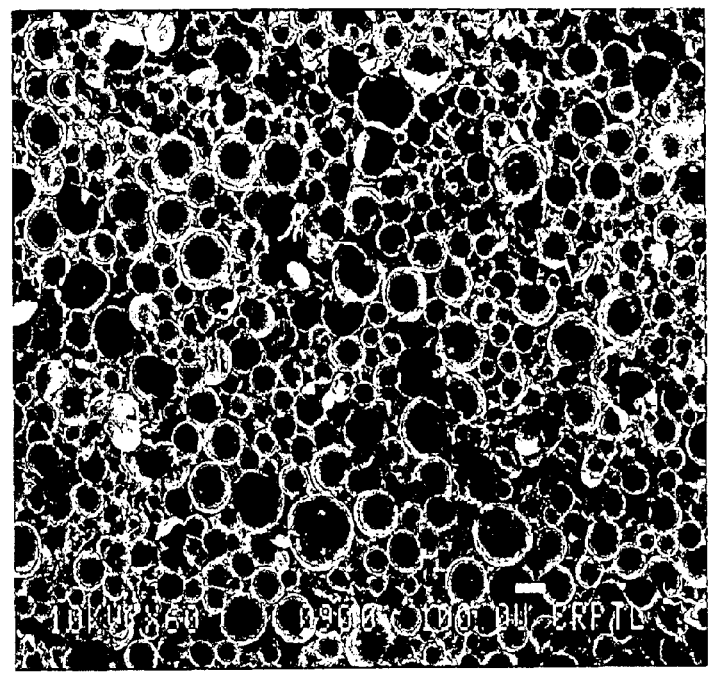
FIGS. 12a–12b are SEM photomicrographs of cross-sections, as viewed in the machine direction (MD) and crossweb direction (CD), respectively, of the unoriented foam described in Example 86.
Figure 12B:
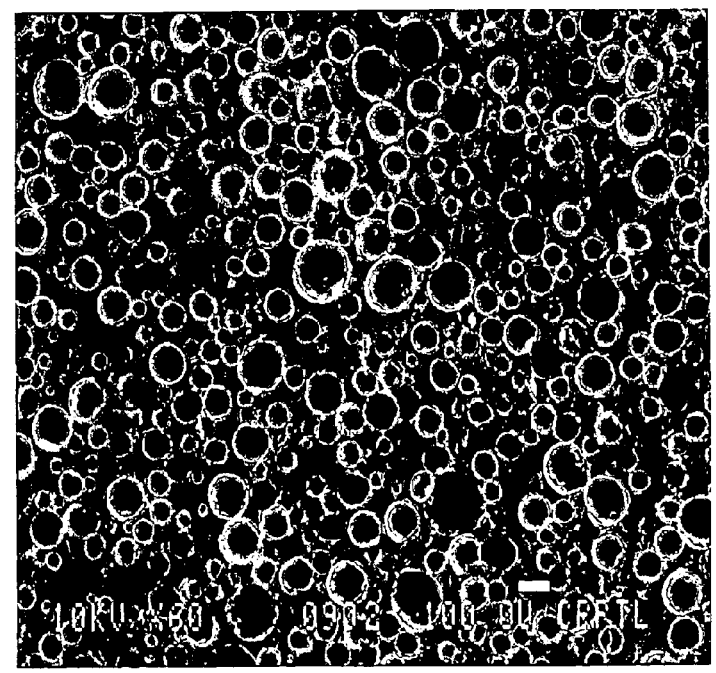
Figure 12C:
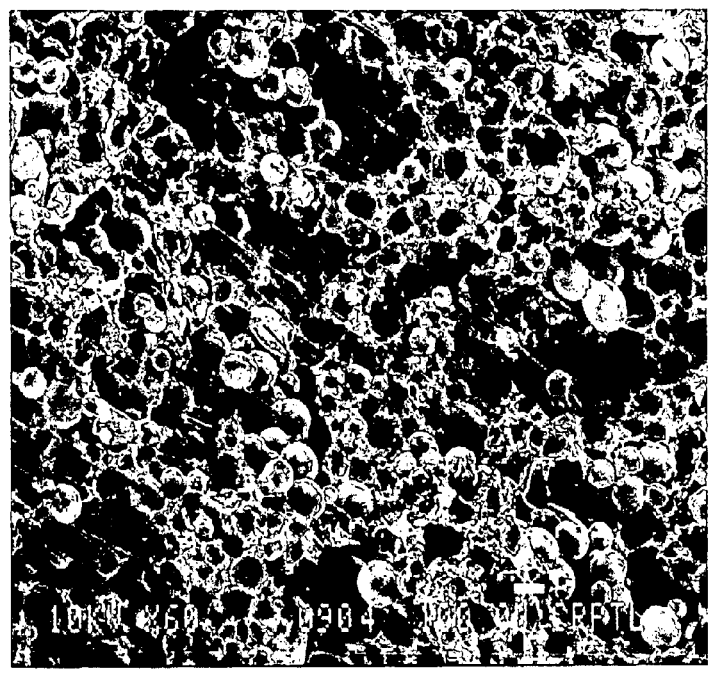
FIGS. 12c–12d are SEM photomicrographs of cross-sections, as viewed in the machine direction (MD) and crossweb direction (CD), respectively, of the axially oriented foam described in Example 86.
Figure 12D:

Post processing techniques, which may include lamination, embossing, extrusion coating, solvent coating, or orientation, may be performed on the foam to impart superior properties. The foams may be uni-axially or multi-axially oriented (i.e., stretched in one or more directions) to produce foam structures that contain microvoids between or a separation of the foam matrix and the expandable microspheres (See Examples 85–92). FIGS. 12*a*–12*d* show SEM micrographs of the microstructure of the foam of Example 86, before (FIGS. 12*a* and 12*b*) and after (FIGS. 12*c* and 12*d*) uniaxial orientation. FIGS. 12*a* and 12*c* are cross-sectional views of the foam microstructure as seen in the machine direction (MD). That is, for FIGS. 12*a* and 12*c*, the foam was sectioned perpendicular to the direction the foam flows as it exits the die and viewed in the direction of flow. FIGS. 12*b* and 12*d* are cross-sectional views of the foam microstructure as seen in the crossweb direction (CD). That is, for FIGS. 12*b* and 12*d*, the foam was sectioned parallel to the direction the foam flows as it exits the die and viewed in the direction perpendicular to the direction of flow.

The selection of the foam matrix, expandable microsphere type/concentration and orientation conditions can affect the ability to produce microvoided foam materials. Orientation conditions include the temperature, direction(s) of stretch, rate of stretch, and degree of stretch (i.e., orientation ratio). It is believed that the interfacial adhesion between the foam matrix and the expandable microspheres should be such to allow at least some debonding to occur around the microspheres upon stretching (i.e., orientation). It is also believed that poor interfacial adhesion can be preferable. Furthermore, it has be found desirable for the foam matrix to be capable of undergoing relatively high elongation (e.g., at least 100%). Orientation of the foam samples can cause a reduction in density of the foam (e.g., up to about 50%) due to the formation of microvoids between the foam matrix and the microspheres that form during orientation. Microvoids can remain after the stretching (orientation) process or they can disappear (i.e., collapse but the interface remains unbonded). In addition, delamination between the foam matrix and the microspheres, with or without a noticeable density reduction, can result in a significant alteration of the mechanical properties of the foam (e.g., increase in flexibility, reduction in stiffness, an increase in softness of foam, etc.). Depending on the ultimate foam application, the material selection and the orientation conditions can be selected to generate desired properties.

It can be desirable for the extrudable polymer composition to be crosslinkable. Crosslinking can improve the cohesive strength of the resulting foam. It may be desirable for the crosslinking of the extrudable polymer to at least start between the melt mixing step and exiting of the polymer through the die opening, before, during or after foaming, such as by the use of thermal energy (i.e., heat activated curing). Alternatively or additionally, the extrudable polymer composition can be crosslinked upon exiting the die such as, for example, by exposure to thermal, actinic, or ionizing radiation or combinations thereof. Crosslinking may also be accomplished by using chemical crosslinking methods based on ionic interactions. The degree of crosslinking can be controlled in order to influence the properties of the finished foam article. If the extruded polymer is laminated, as described herein, the polymer extrudate can be crosslinked before or after lamination. Suitable thermal crosslinking agents for the foam can include epoxies and amines. Preferably, the concentrations are sufficiently low to avoid excessive crosslinking or gel formation before the composition exits the die.

Use

The foam-containing articles are useful in a variety of applications including, for example and not by way of limitation, aerospace, automotive, and medical applications. The properties of the articles are tailored to meet the demands of the desired applications. Specific examples of applications include vibration damping articles, medical dressings, tape backings, retroreflective sheet backings, anti-fatigue mats, abrasive article backings, raised pavement marker adhesive pads, gaskets, and sealants.

The invention will now be described further by way of the following examples.

EXAMPLES

Test Methods

Surface Roughness

The surface topology as a function of displacement was measured using a Laser Triangulation Profilometer (Cyberscan 200, available from Cyberoptics of Minneapolis, Minn.). All the measurements were collected at room temperatures using a HeNe laser (654 nm) with a point range selector resolution of 1 micrometer (PRS-40). The laser was programmed to move across the sample in discrete jumps of 25 micrometers with a total of 50 jumps (total length=1250 micrometers). The sample size measured 1250×1250 micrometers. The roughness data was leveled by subtracting a linear regression fit of the data and positioning the average at zero. The surface roughness, Ra, was calculated using the following relationship:

$$R_a = \frac{1}{L_m} \int_0^{L_m} |z(x)| dx \quad (1)$$

where $R_a$ is the surface roughness, $L_m$ is the total displacement length, and z is the height at a displacement of x.

90° Peel Adhesion

A foam pressure-sensitive adhesive sheet is laminated to a sheet of 0.127 mm thick anodized aluminum. A strip of tape measuring 1.27 cm by 11.4 cm is cut from the sheet and applied to a metal substrate that was painted with a basecoat/clear coat automotive paint composition (RK-7072 from DuPont Co.) The strip is then rolled down using four total passes of using a 6.8 kg metal roller. The sample is aged at one of the following conditions before testing:

1 hour at room temperature (22° C.)
3 days at room temperature (22° C.)
7 days at 70° C.
5 days at 100° C. and 100% humidity After aging, the panel is mounted in an Instron™ Tensile Tester so that the tape is pulled off at a 90 degree angle at a speed of 30.5 cm per minute. Results are determined in pounds per 0.5 inch, and converted to Newtons per decimeter (N/dm).

T-Peel Adhesion

This test is performed according to ASTM D3330-87 except as specified. A strip of foam tape measuring 11.43 cm by 1.27 cm wide is laminated between two anodized aluminum strips (10.16 cm long by 1.59 cm wide by 0.127 mm thick). The laminated test sample is conditioned for at least 1 hour at room temperature (22° C.), and then tested for cohesive strength using an Instron™ Tensile tester at a 180° peel and a crosshead speed of 30.48 inches per minute. The test results are recorded in pounds per ½ inch width and results are converted to newtons/decimeter (N/dm).

Tensile and Elongation

This test is performed according to ASTM D412-92 except as specified. A sample of the foam is cut into a "dog bone" shape having a width of 0.635 mm in the middle portion. The ends of the sample are clamped in an Instron Tensile Tester and pulled apart at a crosshead speed of 50.8 cm per minute. The test measures peak stress (in pounds per square inch and converted to kiloPascals (kPas)), the amount of elongation or peak strain (in % of the original length), and peak energy (in foot pounds and converted to joules (J).

Static Shear Strength

A 2.54 cm by 2.54 cm strip of pressure-sensitive adhesive foam tape is laminated to a 0.51 mm thick anodized aluminum panel measuring about 2.54 cm by 5.08 cm. A second panel of the same size is placed over the tape so that there is a 2.54 cm overlap, and the ends of the panels extend oppositely from each other. The sample is then rolled down with a 6.8 kg metal roller so that the total contact area of the sample to the panel was 2.54 cm by 2.54 cm. The prepared panel is conditioned at room temperature, i.e., about 22° C. for at least 1 hour. The panel is then hung in a 70° C. oven and positioned 2 degrees from the vertical to prevent a peel mode failure. A 750 gram weight is hung on the free end of the sample. The time required for the weighted sample to fall off of the panel is recorded in minutes. If no failure has occurred within 10,000 minutes, the test is discontinued and results are recorded as 10,000+minutes.

Hot Melt Composition 1

A pressure-sensitive adhesive composition was prepared by mixing 90 parts of IOA (isooctyl acrylate), 10 parts of AA (acrylic acid), 0.15 part 2,2 dimethoxy-2-phenylacetophenone (Irgacure™651 available from Ciba Geigy) and 0.03 parts of IOTG (isooctyl thioglycolate). The composition was placed into packages measuring approximately 10 cm by 5 cm by 0.5 cm thick packages as described in U.S. Pat. No. 5,804,610, filed Aug. 28, 1997, issued Sep. 8, 1998 and incorporated herein by reference. The packaging film was a 0.0635 thick ethylene vinylacetate copolymer (VA-24 Film available from CT Film of Dallas, Tex.) The packages were immersed in a water bath and at the same time exposed to ultraviolet radiation at an intensity of 3.5 milliWatts per square centimeter and a total energy of 1627 milliJoules per square centimeter as measured in NIST units to form a packaged pressure-sensitive-adhesive. The resulting adhesive had an IV (intrinsic viscosity of about 1.1 deciliters/gram, Mw of $5.6 \times 10^5$ g/mol and Mn of $1.4 \times 10^5$ g/mol.

Hot Melt Composition 2

A packaged adhesive was prepared following the procedure for Hot Melt Composition 1 except that 97 parts of IOA and 3 parts of AA were used.

Hot Melt Composition 3

A packaged adhesive was prepared following the procedure for Hot melt Composition 1 except that 80 parts IOA and 20 parts AA were used.

Hot Melt Composition 4

A hot melt pressure-sensitive adhesive composition having 96 parts IOA and 4 parts methacrylic acid was prepared following the procedure described in U.S. Pat. No. 4,833,179 (Young et al.) incorporated in its entirety herein by reference.

Hot Melt Composition 5

A packaged adhesive was prepared following the procedure for Hot Melt Composition 1 except that 46.25 parts of isooctyl acrylate, 46.25 parts of n-butyl acrylate (nBA), and 7.5 parts of acrylic acid were used. The packaged adhesives was then compounded in a twin screw extruder with 17% Escorez™180 tackifier (available from Exxon Chemical Corp.) to form Hot Melt Composition 5.

Hot Melt Composition 6

A hot melt adhesive composition was prepared following the procedure for Hot Melt Composition 5 except that the packaged adhesive composition was 45 parts IOA, 45 parts nBA, and 10 parts AA were used.

Hot Melt Composition 7

A packaged hot melt composition was prepared following the procedure for Hot Melt Composition 1 except that the composition in the packages also included 0.25 parts of acryloxybenzophenone per one hundred parts of acrylate.

Hot Melt Composition 8

A hot melt composition having 90 parts IOA and 10 parts AA was prepared following the procedure for Example 1 of U.S. Pat. No. 5,637,646 (Ellis), incorporated in its entirety herein by reference.

Hot Melt Composition 9

A hot melt composition having 95 parts IOA and 5 parts AA was prepared following the procedure for Hot Melt Composition 1.

Hot Melt Composition 10

A hot melt composition having 90 parts 2-ethylhexyl acrylate and 10 parts AA was prepared following the procedure for Hot Melt Composition 1.

Extrusion Process

The packaged hot melt composition was fed to a 51 mm single screw extruder (Bonnot) and compounded. The temperatures in the extruder and the flexible hose at the exit end of the extruder were all set at 93.3° C. and the flow rate from was controlled with a Zenith gear pump. The compounded adhesive was then fed to a 30 mm co-rotating twin screw extruder with three additive ports (Werner Pfleider) operating at a screw speed of 200 rpm with a flow rate of about 10 pounds/hour (4.5 kilograms/hour). The temperature for all of the zones in the twin screw extruder was set at the specific temperatures indicated in the specific examples. Expandable polymeric microspheres were added downstream to the third feed port about three-fourths of the was down the extruder barrel. The hose and die temperatures were set at the temperatures indicated for the specific examples. The extrudate was pumped to a 15.24 cm wide drop die that was shimmed to a thickness of 1.016 mm. The resulting foam sheets had a thickness of about 1 mm. The extruded sheet was cast onto a chill roll that was set at 7.2° C., cooled to about 25° C., and then transferred onto a 0.127 mm thick polyethylene release liner.

Examples 1–5

Foam sheets for Examples 1–5 were prepared using Hot Melt Composition 1 in the process described above using varying amounts of expandable polymeric microspheres having a shell composition containing acrylonitrile and methacrylonitrile (F100D available from Pierce Stevens, Buffalo, N.Y.). The amounts of microspheres in parts by weight per 100 parts of adhesive composition (EMS—pph) are shown in Table 1. The extruder temperatures were set at 93.3° C., and the hose and die temperatures were set at 193.3° C. After cooling, the extruded foam sheets were transferred to a 0.127 mm thick polyethylene film and crosslinked using an electron beam processing unit (ESI Electro Curtain) operating at an accelerating voltage of 300 keV and at a speed of 6.1 meters per minute. The measured e-beam dose was 4 megaRads (mrads). All of the foams were tacky. The foam sheets in Examples 1,2,4, and 5 were bonded (e.g., laminated) to a two-layer film adhesive using pressure from a nip roll to make a tape. The first layer of the film adhesive was prepared by dissolving 10 parts polyamide (Macromelt 6240 from Henkel) in a solvent blend of 50 parts isopropanol and 50 parts n-propanol, coating the solution onto a release liner, and drying and oven at 121° C. for about 15 minutes. The second layer of the film adhesive was a solvent based pressure sensitive adhesive having a composition of 65 parts IOA, 30 parts methyl acrylate, and 5 parts AA made according to the method disclosed in Re24906 (Ulrich), incorporated herein by reference. A release liner was then placed over the solvent based pressure-sensitive adhesive, and the polyamide side of the film adhesive was pressure laminated to the foam. The tapes were tested for 90° peel adhesive, T-peel adhesion, tensile and elongation, and static shear strength. Test results and foam densities for all of the examples are shown in Table 1.

The foam of Example 1 had a surface roughness ($R_a$) of 29 micrometers.

Example 6

A foam sheet was prepared following the procedure for Example 3 except that the extruder temperatures were set at 121° C., and the hose and die temperatures were set at 177° C. After cooling, the foam was crosslinked with a dose of 8 mrads.

Examples 7–9

Pressure-sensitive adhesive coated foam tapes were prepared following the procedure for Example 1 except that the extruder temperatures were set at 121° C. and the amounts of microspheres were 6, 8, and 10 pph for Examples 7,8, and 9 respectively.

Examples 10–13

Foam sheets were prepared following the procedure for Example 3 except that the extruder temperatures were set at 82° C., the hose and die temperatures were set at 104° C., and according to the conditions specified below.

For Example 10, 2 pph expandable polymeric microspheres (F50D available from Pierce Stevens) were used and the extruder flow rate was 4.08 kg per hour.

For Example 11, 2 pph expandable polymeric microspheres having a shell composition containing acrylonitrile, vinylidene chloride, and methylmethacrylate (Expancel 461 encapsulated microspheres available from Akzo Nobel) were used.

For Example 12, 2 pph expandable polymeric microspheres having a shell composition containing acrylonitrile, methacrylonitrile, and methyl methacrylate (Expancel 091 available from Akzo Nobel) were used, the extruder temperatures were set at 93.9° C., and the hose and die temperatures were set at 193.3° C. The foam was measured for mean free spacing. The surface roughness ($R_a$) was 14 micrometers, and a portion of the foam is shown in FIG. 1(a) and 1(b).

Example 13 was prepared following the procedure for Example 12 except that it used 2 pph expandable polymeric microspheres having a shell containing acrylonitrile, methacrylonitrile, and methyl methacrylate (F80SD microspheres available from Pierce Stevens) and the extruder temperatures were set at 93.3° C. Additionally, 0.15 parts by weight per one hundred parts of acrylate of 2,4-bis (trichloromethyl)-6-4-methoxyphenyl)-s-triazine was mixed with the expandable polymeric microspheres and added to the extruder. The resulting foam was crosslinked with a mercury vapor lamp with 500 milliJoules/square centimeter of energy (NIST units). The foam had a surface roughness ($R_a$) of 33 micrometers.

Examples 14–15

Pressure-sensitive adhesive foam tapes were prepared following the procedures for Examples 2 and 3, respectively, except that the extruder temperatures were set at 121° C., and 10% by weight of a melted tackifier (Escorez™180 obtained from Exxon Chemical Co.) was added to the first port in the extruder barrel. The flow rate of the extrudate was 4.08 kg per hour of compounded acrylate and 0.45 kg per hour of tackifier. The cooled foam was crosslinked with a dose of 8 mrads.

Example 16

A pressure-sensitive adhesive foam tape was prepared following the procedure for Example 2 except that 0.2 parts per one hundred parts of acrylate of a chemical blowing agent (of 4,4' oxybis(benzenesulfonylhydrazide) obtained as Celogen OT from Uniroyal Chemical Co.) was mixed with the microspheres and to added to the extruder.

Example 17

A pressure-sensitive adhesive foam tape was prepared following the procedure for Example 2 except that the extruder temperatures were maintained at 110° C. A mixture of 50 parts by weight F80SD expandable polymeric microspheres and 50 parts of a chemical blowing agent mixed (BIH, a mixture of 85% sodium bicarbonate and 15% citric acid, available from Boehringer-Ingelheim) was added at a rate of 2 pph. The extruder rate flow was 3.54 kg per hour. The resulting foam was crosslinked with as in Example 1 at a dose of 6 mrads.

Example 18

A foam sheet was prepared following the procedure for Example 3 except that 1.6 pph of F80SD expandable polymeric microspheres were added as well as 0.4 pph glass bubbles (S-32 available from Minnesota Mining & Manufacturing Company). The microspheres and glass bubbles were mixed together before adding to the extruder.

The foam had a surface roughness ($R_a$) of 24 micrometers on one major surface and 21 micrometers on the other major surface.

Examples 19–20

Foam sheets were prepared following the above extrusion process using Hot Melt Composition 3 and with 2 pph expandable polymeric microspheres (F80SD). The extruder temperatures were set at 110° C., and the hose and die temperatures were set at 193° C. The extruder feed rate was 3.58 kg/hr. Example 20 also included a plasticizer (Santicizer 141 available from Monsanto) and which was fed into the extruder at 0.36/hr. The foams were crosslinked following the procedure in Example 1. Example 19 was further laminated to the film adhesive of Example 1.

Example 21

A foam sheet was prepared following the procedure for Example 20 except that Hot Melt Composition 4 was fed directly into the twin screw extruder, and 4 pph F80SD expandable polymeric microspheres were used.

Examples 22–27

Pressure-sensitive adhesive foam sheets having the film adhesive of Example 2 were prepared following the procedure for Example 2 except that F80 expandable polymeric microspheres were used instead of F100D and the extruder temperatures were set at 104° C. Additives were also fed to the first extruder port in the type and amount for each example as follows:

Example 22—10% by weight of the extrudate of polyethylene (Engage™8200 available from Dow Chemical Co.) was added to the extruder at a rate of 0.45 kg/hr in the first port.

Example 23—20% by weight of the extrudate of styrene-isoprene-styrene block copolymer (Kraton™ D1107available from Shell Chemical Co.) was added to the extruder at a rate of 0.9 kg/hr. The foam had a surface roughness ($R_a$) of 25 micrometers on one major surface and 19 micrometers on the other major surface.

Example 24—Same as Example 23 except that no other adhesive was laminated to the foam.

Example 25—25% by weight of the extrudate of polyester (Dynapol™1402 (available from Huls America) was added to the extruder at a rate of 1.13 kg/hr.

Example 26—Same as Example 25 except that no other adhesive was laminated to the foam.

Example 27

A pressure-sensitive adhesive foam sheet was prepared using Hot Melt Composition 7 and 2 pph expandable polymeric microspheres (F80SD). The extruder temperatures were set at 104° C. and the hose and die temperatures were set at 193° C. The resulting foam was cooled and crosslinked with an electron beam dose of 4 mrads at an accelerating voltage of 300 kilo-electron volts (Kev).

Example 28

A single layer foam sheet was prepared following the procedure for Example 3 except a 25.4 cm wide vane coextrusion die was used instead of a drop die, the extruder temperature was set at 104° C., and F80SD expandable polymeric microspheres were used. There was no flow of material through the outer vanes. The cooled foam was crosslinked with an electron beam dose of 6 mrads at an accelerating voltage of 300 Kev.

Example 29

A foam sheet prepared following the procedure for Example 28 except that Hot Melt Composition 2 was used.

Example 30

A foam sheet for was prepared following the procedure for Example 29 except that F100D expandable polymeric microspheres were used.

Examples 31–33

Foam sheets were prepared following the procedure for Example 28 except that the outer vanes were open and a layer of Hot Melt Composition 5 was coextruded on each major surface of the foam sheet. The thickness of the layer of Composition 3 was 50 micrometers, 100 micrometers and 150 micrometers (i.e., 2 mils, 4 mils, and 6 mils) for Examples 31, 32, and 33 respectively. The extruder and hose temperatures for the additional layers were set at 177° C. The foam sheet of Example 31 had a surface roughness of ($R_a$) 24 micrometers.

Example 34

A foam sheet was prepared following the procedure for Example 31 except that the extruder temperatures were set at 93.3° C. and the hose and die temperatures were set at 171° C. and a tackifier was added. The extruder feed rate was 4.08 kg/hr for Composition 1 and 0.45 kg/hr for a tackifier (Escorez™180). Hot Melt Composition 5 was coextruded to a thickness of 100 micrometers on each major surface of the foam. The coextruded composite was crosslinked with an electron beam at an accelerating voltage of 275 Kev and a dose of 8 mrads.

Example 35

A foam sheet was prepared following the procedure for Example 34 except that instead of the tackifier, low density polyethylene (Dowlex™2517 available from Dow Chemical Co.)) was added to the extruder at feed rate of 1.36 kg/hr and Composition 1 was fed in at a rate of 3.18 kg/hr. Hot melt Composition 6 was coextruded to a thickness of 50 micrometers on each major surface of the foam. The resulting coextruded composite was cooled and crosslinked with an electron beam accelerating voltage of 250 Kev and a dose of 6 mrads.

Examples 36–37

Pressure-sensitive adhesive foam sheets were prepared following the procedure for Example 31 except that the microspheres used were a 50/50 blend of F80SD and F100D microspheres and the extruder temperatures were set at 93° C., and the hose and die temperatures were set at 171° C. Example 36 was crosslinked with an e-beam accelerating voltage of 250 Kev and a dose of 6 mrads. The outer vanes of the die were opened for Example 37 and the foam was coextruded with 0.15 mm thick layer of low density polyethylene (Dowlex™2517) on one major surface of the foam. After cooling, the polyethylene layer could be removed from the adhesive. This example illustrates the pressure-sensitive adhesive foam with a liner. Furthermore, the two layer composite can be crosslinked with an electron beam to bond the foam permanently to the polyethylene.

Example 38

A pressure-sensitive adhesive foam sheet was prepared following the procedure for Example 28 except that Hot Melt Composition 8 was fed directly to the twin screw extruder.

Example 39

A pressure-sensitive adhesive foam sheet was prepared following the procedure for Example 19 except that Hot Melt Composition 9 was used and the extruder feed rate was 4.5 kg/hr.

Examples 40–42

Foam sheets were prepared by extruding Composition 1 with ethylene vinyl acetate copolymer (EVA). The EVA used for Examples 40, 41, and 42 were Elvax™250 (melt index of 25, vinyl acetate content of 28%), Elvax™260 (melt index of 6.0, vinyl acetate content of 28%), and Elvax™660 (melt index of 2.5, vinyl acetate content of 12%) respectively. All of the EVAs were obtained from DuPont Co. Composition 1 was fed to the extruder at a rate of 2.7 kg/hr and the EVA was fed at a rate of 1.8 kg/hr. A loading of 3 pph F100D expandable polymeric microspheres was used. The extruder temperatures were set at 104° C. and the hose and die temperatures were set at 193° C. Additionally, Examples 40 and 41 were coextruded with a 0.064 mm thick layer of Hot Melt Composition 1 on both major surfaces of the foam. All of the coextruded foams were crosslinked with an electron beam accelerating voltage of 300 Kev and a dose of 6 mrad. The surface roughness ($R_a$) of Example 40 was 27 micrometers.

Example 43

A non-tacky foam sheet was prepared following the procedure for Example 40 except that only EVA (Elvax™250) was extruded with 3 pph expandable polymeric microspheres (F100D). The surface roughness ($R_a$) was 23 micrometers on one major surface of the foam and 27 micrometers on the other major surface of the foam.

Example 44

A foam sheet was prepared following the procedure for Example 40 except that instead of EVA, a high density polyethylene (Dowlex™IP-60 available from Dow Chemical Co.). The feed rates of Composition 1 and the polyethylene were 3.63 kg/hr and 0.91 kg/hr, respectively.

Example 45

A foam sheet was prepared following the procedure for Example 44 except that a low density polyethylene (Dowlex™2517) was used. The feed rates of Composition 1 and the polyethylene were 3.18 kg/hr and 1.36 kg/hr, respectively.

Example 46

A foam sheet was prepared following the procedure for Example 44 except that Hot Melt Composition 9 was extruded with a polyester (Dynapol™1157 available from Huls) and 3 pph expandable polymeric microspheres (F80). The extruder temperature was set at 93° C. and the hose and die temperatures were set at 171° C. The end plates of the die were set at a temperature of 199° C. to form a uniform thickness across the sheet. The feed rates of Composition 9 and the polyester were 3.18 kg/hr and 1.36 kg/hr, respectively. The resulting foam was cooled and then crosslinked with an electron beam accelerating voltage of 275 Kev and a dose of 6 mrads.

Example 47

A nontacky foam sheet was prepared following the procedure for Example 46 except that only polyester (Dynapol™157) was extruded with 4 pph expandable polymeric microspheres (F80SD). The foam had a surface roughness ($R_a$) of 27 micrometers.

Example 48

A 2.54 cm diameter cylindrical foam was prepared following the procedure of Example 44 except that both Hot Melt Composition 1 and the high density polyethylene were fed to the extruder at a rate of 2.27 kg/hr with 2 pph expandable polymeric microspheres (F80SD). The die was removed so the foam was extruded from the hose in a cylindrical shape.

Example 49

A 1.27 cm diameter cylindrical foam was prepared following the procedure of Example 23 except that both Hot Melt Composition 1 and the block copolymer were fed to the extruder at a rate of 2.27 kg/hr with 2 pph expandable polymeric microspheres (F80SD). The die was removed and the foam was extruded from the hose in a cylindrical shape.

Examples 50–52

A foam sheet for Example 50 was prepared by feeding a styrene-isoprene-styrene block copolymer (Kraton™D1107) to the twin screw extruder of Example 1 at a feed rate of 1.8 kg/hr. A tackifier (Escorez™1310 LC, available from Exxon Chemical Co.) was fed into the first port at a feed rate of 1.8 kg/hr. and expandable polymeric microspheres (F80SD) were fed to the third port at a rate of 2 parts per one hundred parts of block copolymer and tackifier. The extruder temperatures were set at 121° C. and the hose and die temperatures were set at 193° C. The resulting foam adhesive had a density of 33.7 lbs/ft$^3$ (539.2 Kg/m$^3$). This sample possessed stretch activated release (i.e., stretch releasable) characteristics such as that described in the Bries et al U.S. Pat. No. 5,507,464, which is incorporated herein by reference.

In Example 51, a foam sheet was prepared following the procedure of Example 51 except that 8 pph of F80SD expandable polymeric microspheres were used. The resulting foam adhesive had a density of 16.5 lbs/cubic ft (264 kg/m$^3$).

In Example 52, a foam sheet was prepared following the procedure of Example 51 except that the block copolymer was styrene-ethylene-butylene-styrene block copolymer (Kraton G1657 available from Shell Chemical Co.) and the tackifier was Arkon P-90 (available from Arakawa Chemical USA). The resulting foam adhesive had a density of 36.9 lbs/cubic ft (590.4 kg/m$^3$), This sample also possessed stretch activated release characteristics as described in the above incorporated Bries et al US Patent and published PCT Applications.

Example 53

A foam sheet was prepared following the procedure for Example 31 except that the extruder temperatures were set at 93° C., and the hose and die temperatures were set at 171° C. The foam was coextruded a 0.1 mm layer of adhesive on each major surface of the sheet. The adhesive was a tackified styrene-isoprene-styrene block copolymer (HL2646 available from HB Fuller). The resulting foam had a density of 29 lbs/cubic foot (464 kg/m$^3$).

Examples 54–57

Foam sheets were prepared by feeding polyhexene having an intrinsic viscosity of 2.1 to the twin screw extruder at a rate of 4.5 kg/hr and expandable polymeric microspheres (F100D) at a rate of 2 pph for Example 54 and 4 pph for Example 55. Foam sheets for Examples 56 and 57 were prepared following the procedure for Examples 54 and 55, respectively, except that the polyhexene was fed to the extruder at a rate of 3.31 kg/hr and a tackifier (Arkon P-115 available from Arakawa Chemical USA) was fed to the first port at a rate of 1.63 kg/hr, and the expandable polymeric microspheres were mixed with 0.3 pph 2,4-bis(trichloromethyl)-6-4-methoxyphenyl)-s-triazine before adding to the extruder.

Example 58

Hot Melt Adhesive Composition 1 was processed in a 10.16 mm Bonnot single screw extruder. The extruder was operated at room temperature, relying only on mechanically generated heat to soften and mix the composition. The mixture was then fed into Zone 1 of a twin screw extruder (40 mm Berstorff (ZE-40) co-rotating twin screw extruder) where it was mixed with expandable polymeric microspheres (F100). A standard compounding screw design was used with forward kneading in Zone 2, reverse kneading in Zone 4, Zone 6, and Zone 8 with self-wiping conveying elements in the remaining zones. Screw speed was 125 RPM resulting in operating pressures of 52.7 kiloPascals and total flow rates of 11.3 kg/hr. The temperatures in the extruder were set at 104° C., and the hose and die temperatures were set at 193° C. This temperature profile prevented expansion during compounding and minimize the rupturing of the expandable polymeric microspheres. Flow of the extrudate was controlled using a Nonmag gear pump. The expandable polymeric microspheres were metered into Zone 7 of the twin screw extruder using a Gehricke feeder (GMD-60/2) at rates of 0.23 kg/h. A 15.24 cm wide drop die shimmed at 1 mm was operated at 193° C. The web was cast onto a chilled cast roll and laminated to a release liner at a speed of 1.5 meters per minute. Following coating, the foam sheet was electron beam crosslinked using an ESI Electro Curtain at dose of 8 mrad at accelerating voltage of 300 keV. The resulting foam is shown in FIG. 2(a) and 2(b). The foam had a surface roughness ($R_a$) of 37 micrometers.

Examples 59–61

These examples illustrate foams that are suitable for use in a foam-in-place application. A foam sheet for Example 59 was prepared following the procedure for Example 3 except that it contained 10 pph F80SD expandable polymeric microspheres and the extruder, hose, and die temperatures were all set at 88° C. to minimize expansion of the foam in the die. The foam was not crosslinked and had a density of 55 lbs/cubic foot (880 kg/m$^3$). After subsequent heating to a temperature of 193° C. for five minutes, the density was reduced to 13 pounds/cubic foot (208 kg/m$^3$). A foam for Example 60 was prepared following the procedure for Example 59 except that Hot Melt Composition 2 was used and the extruder, hose, and die temperatures were all set at 104° C. After cooling, the foam had a density of 60 lbs/cubic ft (960 kg/m$^3$). After subsequent heating to a temperature of 193° C. for five minutes, the density was reduced to 15 lbs/cubic foot (240 kg/m$^3$). A foam sheet for Example 61 was prepared following the procedure for Example 59 except that polyester (Dynapol™1157) was fed to the extruder at a rate of 9 kg/hr, and the temperatures for the extruder, hose, and die were all set at 110° C. The 1.14 mm thick foam sheet was crosslinked with an electron beam accelerating voltage of 275 Kev and a dose of 6 mrad.

TABLE 1

| Ex | EMS pph | Foam Density Kg/m³ | 90° Peel adhesion - N/dm | | | | T-peel 100/100 N/dm | Tensile & Elongation | | | Overlap Shear Minutes |
|---|---|---|---|---|---|---|---|---|---|---|---|
| | | | 1 hr 21° C. | 3 days 21° C. | 7 days 70° C. | 5 days | | Peak Stress KPas | Elong % | Peak Energy Joules | |
| 1 | 1 | 745.6 | 150.5 | 210 | *843.5 | 269.5 | 399 | 758 | 730 | 1.36 | 10,000+ |
| 2 | 2 | 668.8 | 150.5 | 217 | *728 | 301 | 353.5 | 896 | 645 | 1.50 | 10,000+ |
| 3 | 2 | 668.8 | 133 | 224 | *598.5 | 353.5 | 353.5 | 896 | 725 | 1.77 | 10,000+ |
| 4 | 3 | 608 | 143.5 | 217 | *682.5 | 280 | 339.5 | 965 | 548 | 1.50 | 10,000+ |
| 5 | 4 | 561.6 | 136.5 | 206.5 | *612.5 | 332.5 | 203 | 896 | 499 | 1.28 | 10,000+ |
| 6 | 3 | 672 | 122.5 | 213.5 | *672 | 203 | 262.5 | 1172 | 508 | 1.24 | 10,000+ |
| 7 | 6 | NT | 206.5 | 126 | 112 | 112 | NT | 621 | 201 | 0.39 | 10,000+ |
| 8 | 8 | NT | 77 | 84 | 66.5 | 77 | NT | 586 | 57 | 0.08 | 10,000+ |
| 9 | 10 | NT | 77 | 56 | 56 | 56 | NT | 689 | 49 | 0.08 | 10,000+ |
| 10 | 2 | 782.4 | 80.5 | 101.5 | *479.5 | 171.5 | 217 | 689 | 700 | 0.82 | 10,000+ |
| 11 | 2 | 812.8 | 91 | 115.5 | 437.5 | 217 | 231 | 827 | 699 | 1.09 | 10,000+ |
| 12 | 2 | 584 | 115.5 | 192.5 | *605.5 | 273 | 231 | 1393 | 413 | 1.50 | 10,000+ |
| 13 | 2 | 516.8 | 157.5 | 283.5 | *420 | 241.5 | 213.5 | 634 | 491 | 0.82 | |
| 14 | 2 | 651.2 | 171.5 | 231 | *717.5 | 311.5 | 357 | 827 | 612 | 1.41 | 10,000+ |
| 15 | 2 | 651.2 | 171.5 | 259 | *703.5 | *388.5 | 339.5 | 827 | 667 | 1.46 | 10,000+ |
| 16 | 2 | 572.8 | 175 | 234.5 | *595 | *483 | 294 | 552 | 595 | 1.01 | 10,000+ |
| 17 | 1 | 608 | 77 | 101.5 | *577.5 | 164.5 | 262.5 | 4020 | 623 | 1.31 | 10,000+ |
| 18 | 1.6 | 524.8 | 119 | 157.5 | *430.5 | *448 | 189 | 1027 | 513 | 1.63 | 10,000+ |
| 19 | 2 | 715.2 | 73.5 | 101.5 | *507.5 | 308 | 245 | 4254 | 489 | 3.67 | 10,000+ |
| 20 | 2 | 672 | 52.5 | *290.5 | *528.5 | *525 | 185.5 | 1751 | 652 | 2.45 | 10,000+ |
| 21 | 4 | 436.8 | 80.5 | 77 | *203 | 189 | 42 | 586 | 283 | 1.36 | 10,000+ |
| 22 | 2 | NT | 185.5 | 269.5 | *434 | 273 | NT | 552 | 504 | 0.73 | |
| 23 | 2 | NT | 150.5 | 213.5 | *486.5 | 280 | NT | 655 | 583 | 0.10 | 10,000+ |
| 24 | 2 | NT | 154 | 210 | *640.5 | *528.5 | NT | NT | NT | NT | 10,000+ |
| 25 | 2 | NT | 157.5 | 220.5 | *504 | 357 | NT | 620.55 | 490 | 0.08 | 10,000+ |
| 26 | 2 | NT | 178.5 | *469 | *443 | *430.5 | NT | NT | NT | NT | 10,000+ |
| 27 | 2 | NT | 154 | 164.5 | *588 | 241.5 | NT | 620.55 | 618 | 0.83 | 10,000+ |
| 28 | 2 | 620.8 | 154 | 217 | *453.5 | *479.5 | NT | NT | NT | NT | 10,000+ |
| 29 | 2 | 587.2 | 91 | 87.5 | *434 | 112 | NT | NT | NT | NT | 10,000+ |
| 30 | 2 | 624 | 77 | 87.5 | *392 | 112 | NT | NT | NT | NT | 10,000+ |
| 31 | 2 | 624 | 192.5 | 252 | *451.5 | *395.5 | NT | NT | NT | NT | 10,000+ |
| 32 | 2 | 680 | 196 | 238 | *469 | *455 | NT | NT | NT | NT | 10,000+ |
| 33 | 2 | 713.6 | 189 | 248.5 | *500.5 | *430.5 | NT | NT | NT | NT | 10,000+ |
| 34 | 2 | 624 | 210 | 255.5 | *433 | *427 | 262.5 | 400 | 725 | 1.08 | 10,000+ |
| 35 | 2 | 528 | 52.5 | 52.5 | 189 | 52.5 | 140 | 1703 | 193 | 0.82 | 10,000+ |
| 36 | 2 | 432 | 80.5 | 101.5 | 259 | 147 | 133 | 621 | 370 | 0.54 | 10,000+ |
| 37 | 2 | NT | NT | NT | NT | NT | NT | NT | NT | NT | NT |
| 38 | 2 | 400 | 157.5 | *269.5 | *161 | 185.5 | 126 | 496 | 221 | 0.27 | 10,000+ |
| 39 | 2 | 534.4 | 87.5 | 171.5 | *451.5 | 276.5 | 262.5 | 641 | 56 | 1.09 | 10,000+ |

*Indicates foam split;
NT-sample not tested or data unavailable

Examples 62–70 and Comparative Example C1

Pressure-sensitive adhesive foams were prepared following the procedure for Example 3 with varying amounts of expandable polymeric microspheres shown in Table 2. The extruder temperatures were set at 104° C., and the hose and die temperatures were set at 193° C. Examples 62–66 contained F100D microspheres and Examples 67–70 contained F80SD microspheres. Comparative Example C1 contained no microspheres. None of the examples were crosslinked. The tensile (peak stress), elongation and overlap shear test data show that the properties of the foam can be controlled by the amount of expandable microspheres, and the addition of the microspheres increased the strength of the foam above the same composition that has no microspheres. The overlap shear test used is the same as that described above except that the sample size was 2.54 cm×1.27 cm, using a 1000 g load at 25° C.

TABLE 2

| Example | EMS Pph | Density Kg/m³ | Peak Stress Kpas | Elong % | Overlap Shear Minutes |
|---|---|---|---|---|---|
| 62 | 2 | 590.6 | 634.34 | 1064 | 122 |
| 63 | 4 | 445.9 | 661.92 | 518 | 169 |
| 64 | 6 | 361.5 | 655.025 | 515 | 166 |
| 65 | 8 | 296 | 682.605 | 185 | 129 |
| 66 | 10 | 268.1 | 634.34 | 169 | 113 |
| 67 | 2 | 535.5 | 524.02 | 940 | 122 |
| 68 | 4 | 400.8 | 0 | | 148 |
| 69 | 6 | 293 | 579.18 | 283 | 117 |
| 70 | 8 | 233.3 | 730.87 | 90 | 83 |
| C1 | 0 | 971.7 | 544.7 | 1867 | 82 |

Example 71

A pressure-sensitive adhesive foam was prepared following the procedure for Example 28 except that 5 pph F100D expandable polymeric microspheres were used with Hot Melt Composition 2 and a hydrocarbon tackifier (Foral™85 available from Hercules, Inc. of Wilmington, Del.) was added. The hot melt composition was fed to the extruder at a rate of 2.9 kg/hr and the tackifier was fed to the extruder at a rate of 1.7 kg/hr. The extruder temperatures were set at 93° C., and the hose and die temperatures were set at 177°

C. The resulting foam was approximately 0.38 mm thick, and was subsequently crosslinked with an electron beam dose of 8 mrad at an accelerating voltage of 300 Kev. The adhesive foam was laminated to a flexible retroreflective sheeting described in U.S. Pat. No. 5,450,235 (Smith et al), incorporated herein in its entirety by reference.

The retroreflective sheeting with the foamed adhesive was applied at room temperature to a polyethylene barrel (obtained from Traffix Devices, Inc. of San Clemente, Calif.). The barrel was placed in an oven at about 49° C. for 3 days. The barrel was removed from the oven and kept at room temperature for about 24 hours. Then the barrel was placed in a truck at about −1° C. for a week. The sheeting with the adhesive evaluated showed no delamination or buckling from the barrel at the end of the test period.

Inclusion Coextrusion

Peel Adhesion

The foam inclusion coextrusion samples were laminated to a 0.127 mm thick piece of anodized aluminum. A strip of the tape measuring 1.27 cm by 11.4 cm was cut from the sheet and applied to a stainless steel substrate. The strip was then rolled down using four total passes using a 6.8 kg metal roller. The samples were aged for 1 day at 22° C., 50% relative humidity. After aging the panel is mounted in an Instron Tensile Tester so that the tape is pulled off at a 90 degree angle at a speed of 12 inches/minute (30.5 cm/min.). Samples were tested in both the machine direction (i.e., the direction the foam flows out of the die or MD), with the peel direction being parallel to the filaments, and the crossweb direction (i.e., the direction perpendicular to the flow direction or CD), with the peel direction being perpendicular to the filaments. Results are determined in pounds per 0.5 inch and converted to Newtons per cm (N/cm).

Tensile and Elongation

This test was performed according to ASTM D412-92 except as specified. A sample of the foam was cut into a "dog bone" shape having a width of 2.54 cm in the middle portion. The ends of the sample were clamped in an Instron Tensile Tester and pulled apart at a crosshead speed of 12 inches per minute (30.5 cm/min). The test measures peak stress (in pounds per square inch and converted to kiloPascals (kPas)), and the amount of elongation or peak strain (in % of the original length).

Static Shear Strength

A 2.54 cm by 2.54 cm strip of pressure-sensitive adhesive foam tape was laminated to a 0.51 mm thick stainless steel panel measuring about 2.54 cm by 5.08 cm. A second panel of the same size was placed over the tape so that there was a 2.54 cm overlap, and the ends of the panels extend oppositely from each other. The sample was then rolled down with a 6.8 kg metal roller so that the total contact area of the sample to the panel was 2.54 cm by 2.54 cm. The prepared panel was conditioned at room temperature, i.e., about 22° C. for at least 24 hours. The panel was then hung in a 25° C. oven and positioned 2 degrees from the vertical to prevent a peel mode failure. A 1000 gram weight was hung on the free end of the sample. The time required for the weighted sample to fall off of the panel was recorded in minutes. The static shear samples were tested to failure, and each sample tested exhibited a cohesive failure mode.

Examples 72–84

Foam samples containing embedded thermoplastic filaments were prepared by a continuous extrusion which was carried out using a specially designed co-extrusion die as disclosed in a U.S. Pat. No. 6,447,875 which is incorporated herein by reference in its entirety. A schematic diagram of these samples are shown in FIG. 4. The continuous foam matrix consisted of Hot Melt Composition 1 with IOTG concentration of 0.1 wt % and 2 pph F100D expandable microspheres. The adhesive was added to zone 1 of a 34 mm Leistritz™ fully intermeshing, co-rotating twin screw extruder available from American Leistritz Extruder Corp., Somerville, N.J., fitted with a gear pump. The microspheres were added using a Gericke feeder (GMD-60) into zone 9 of the twin screw extruder. The temperature profile of the twin screw extruder was: zone 1=93° C. (200° F.) and zones 2–12=104° C. (220° F.). The screw configuration of this extruder had two kneading sections prior to microsphere addition and one kneading section after microsphere addition, while the remainder of the screw was conveying elements. The twin screw extruder had a screw speed of 100 rpm, a gear pump speed of 7 rpm, and a head pressure of 9.1 MPa (1320 psi) which provided flow rates of 13.6 kg/h (30 lb/hr). The filament material was a polyethylene-polyoctene copolymer (Engage™ 8200) that was fed to the coextrusion die using a 32 mm (1.25-inch) Killion™ single screw extruder (Model KTS-125 available from Davis-Standard Killion Systems, Cedar Grove, N.J.) with a length to diameter ratio of 24:1 and three barrel zones that were operated with a temperature profile of zone 1—193° C. (380° F.), zone 2—210° C. (410° F.) and zones 3 and 4—232° C. (450° F.). The screw had a Saxton mixing element with a compression ratio of 3:1. The 32 mm extruder was run at 10 rpm with a head pressure of 5.1 MPa (740 psi) which provided flowrates of 0.9 Kg/hr (2 lb/h). The filaments were co-extruded so as to be embedded into the foam using a 45 cm (18 in) wide Cloeren™ two-layer multi-manifold die (available as Model 96-1502 from Cloeren Co., Orange, Tex.) that had been modified. The vane had been hollowed out as shown in the previously incorporated case U.S. Pat. No. 6,447,875, and the leading edge or tip had been cut off to make a vane manifold. The vane tip had circular orifices each having a diameter of 508 microns (20 mils) and separated by a space of 4.1 mm (0.160 in) and extended from the vane tip 2.5 mm (0.001 in) into the matrix flow. The die was operated at 193° C. (380° F.). The foam was cast onto a paper liner at a take-away speed of 1.2 m/min (4 fpm) resulting in an overall thickness of 625 microns (25 mils). The samples were subsequently electron beam cured using ESI Electrocure e-beam at an accelerating voltage of 300 keV and dosage of 6 megarads.

Example 72 was prepared using the aforementioned conditions with a foam matrix consisting of Hot Melt Composition 1 (IOTG=0.1%) and 2 pph of F100D. No filaments were present. This was accomplished by not operating the KTS-125 satellite extruder.

Example 73 was prepared by following the procedure for Example 1 except that the concentration of F100D was 4 pph.

Example 74 was prepared by the aforementioned conditions with a foam matrix of Hot Melt Composition 1 (IOTG=0.1%) with 2 pph F100D. The filaments consisted of 10 w % Dow™ Engage 8200 polyolefin elastomer.

Example 75 was prepared by the aforementioned conditions with a foam matrix of Hot Melt Composition 1 (IOTG=0.1%) with 2 pph F100D. The filaments consisted of 20 w % Dow™ Engage 8200 polyolefin elastomer.

Example 76 was prepared by the aforementioned conditions with a foam matrix of Hot Melt Composition 1 (IOTG=0.1%) with 2 pph F100D. The filaments consisted of 30 w % Dow™ Engage 8200 polyolefin elastomer.

Example 77 was prepared by the aforementioned conditions with a foam matrix of Hot Melt Composition 1

(IOTG=0.1%) with 4 pph F100D. The filaments consisted of 10 w % Dow™ Engage 8200 polyolefin elastomer.

Example 78 was prepared by the aforementioned conditions with a foam matrix of Hot Melt Composition 1 (IOTG=0.1%) with 4 pph F100D. The filaments consisted of 20 w % Dow™ Engage 8200 polyolefin elastomer.

Example 79 was prepared by the aforementioned conditions with a foam matrix of Hot Melt Composition 1 (IOTG=0.1%) with 2 pph F100D. The filaments consisted of 10 w % Shell Kraton D 1107 thermoplastic elastomer.

Example 80 was prepared by the aforementioned conditions with a foam matrix of Hot Melt Composition 1 (IOTG=0.1%) with 2 pph F100D. The filaments consisted of 20 w % Shell Kraton D 1107 thermoplastic elastomer.

Example 81 was prepared by the aforementioned conditions with a foam matrix of Hot Melt Composition 1 (IOTG=0.1%) with 2 pph F100D. The filaments consisted of 30 w % Shell Kraton D 1107 thermoplastic elastomer.

Example 82 was prepared by the aforementioned conditions with a foam matrix of Hot Melt Composition 1 (IOTG=0.1%) with 4 pph F100D. The filaments consisted of 10 w % Exxon Escorene polypropylene 3445.

Example 83 was prepared by the aforementioned conditions with a foam matrix of Hot Melt Composition 1 (IOTG=0.1%) with 4 pph F100D. The filaments consisted of 20 w % Exxon Escorene polypropylene 3445.

Example 84 was prepared by the aforementioned conditions with a foam matrix of Hot Melt Composition 1 (IOTG=0.1%) with 4 pph F100D. The filaments consisted of 30 w % Exxon Escorene polypropylene 3445.

TABLE 3

| Example # | Density g/cm$^3$ | MD Peel Adhesion, N/cm | CD Peel Adhesion, N/cm | MD Static Shear (minutes) | Max Stress @ Break KPas) | Max Elong'n @ Break, (%) |
|---|---|---|---|---|---|---|
| 72 | 0.7348 | 16.5 | 13.7 | 88 | 650 | 720.0 |
| 73 | 0.6496 | 13.9 | 15.3 | 166 | 641 | 546.7 |
| 74 | 0.777 | 14.5 | 20.0 | 98 | 1055 | 441.3 |
| 75 | 0.804 | 9.8 | 11.0 | 95 | 2050 | 986.7 |
| 76 | 0.8007 | 8.9 | 10.4 | 138 | 3233 | 941.7 |
| 77 | 0.6788 | 16.9 | 13.5 | 164 | 784 | 720.0 |
| 78 | 0.709 | 12.2 | 18.4 | 233 | 2245 | 989.7 |
| 79 | 0.7624 | 10.6 | 13.6 | 124 | 809 | 823.3 |
| 80 | 0.7948 | 15.1 | 15.5 |  | 1050 | 880.0 |
| 81 | 0.7848 | 12.8 | 14.0 | 273 | 1108 | 873.3 |
| 82 | 0.6449 | 12.9 | 11.7 | 171 | 1342 | 4.6 |
| 83 | 0.6785 | 9.2 | 19.4 | 120 | 3918 | 7.2 |
| 84 | 0.698 | 8.8 | 17.2 | 193 | 6260 | 6.8 |

Figure 8:
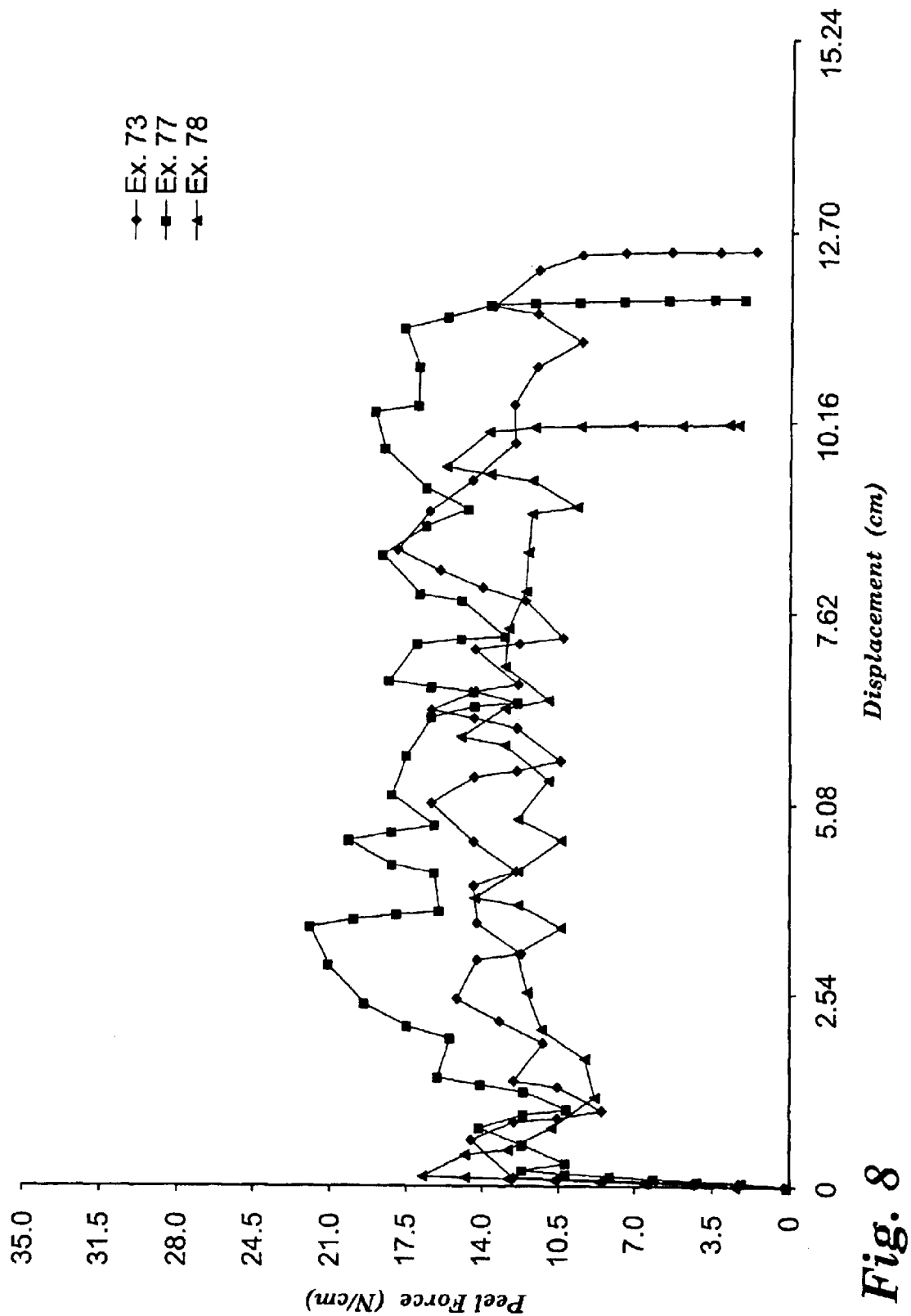
FIG. 8 is a plot showing the peel force applied in a direction (MD) parallel to the filament direction as a function of displacement for Examples 73, 77 and 78.
Figure 9:
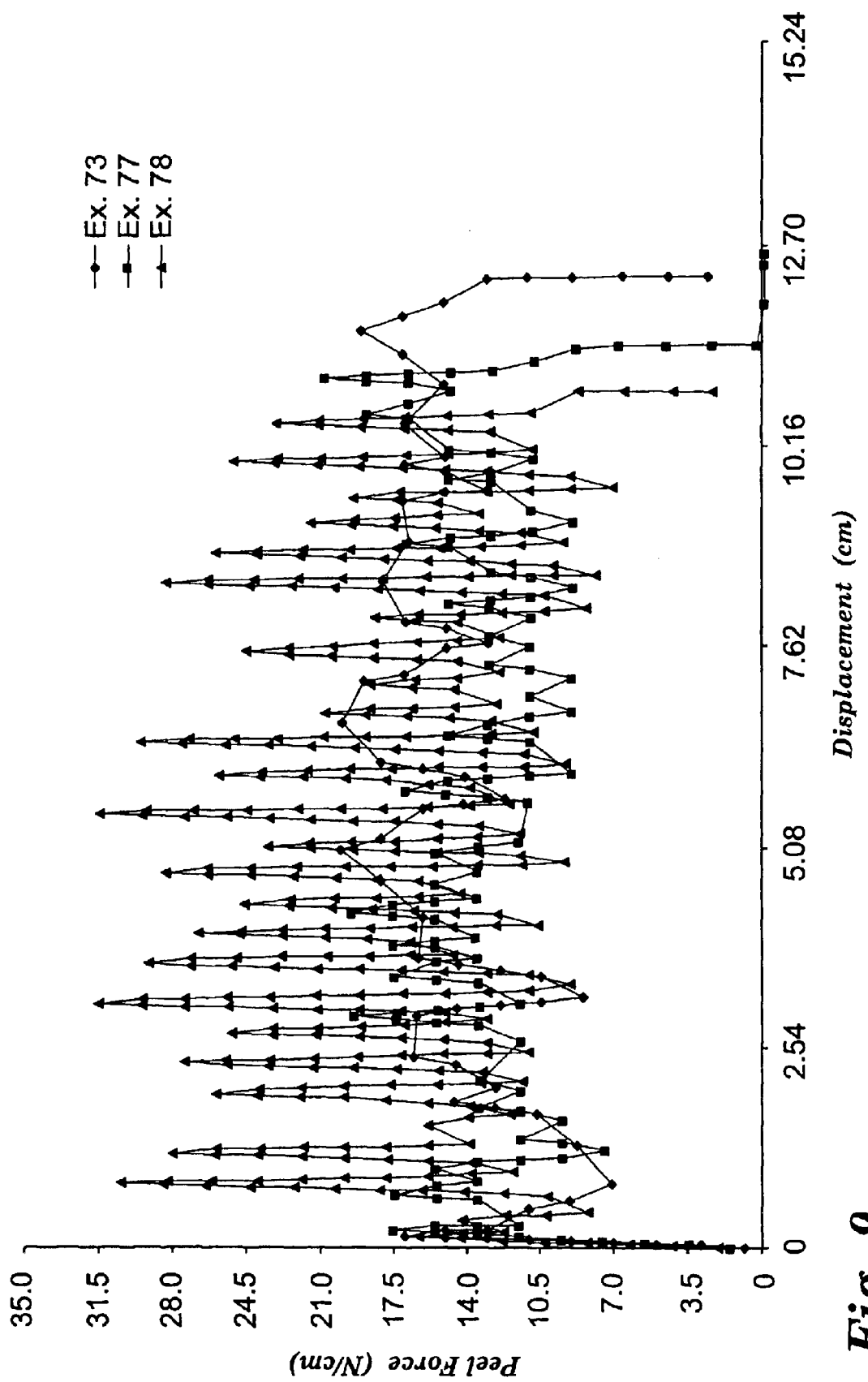
FIG. 9 is a plot showing the peel force applied in a direction (CD) perpendicular to the filament direction as a function of displacement for Examples 73, 77 and 78.
Figure 10:
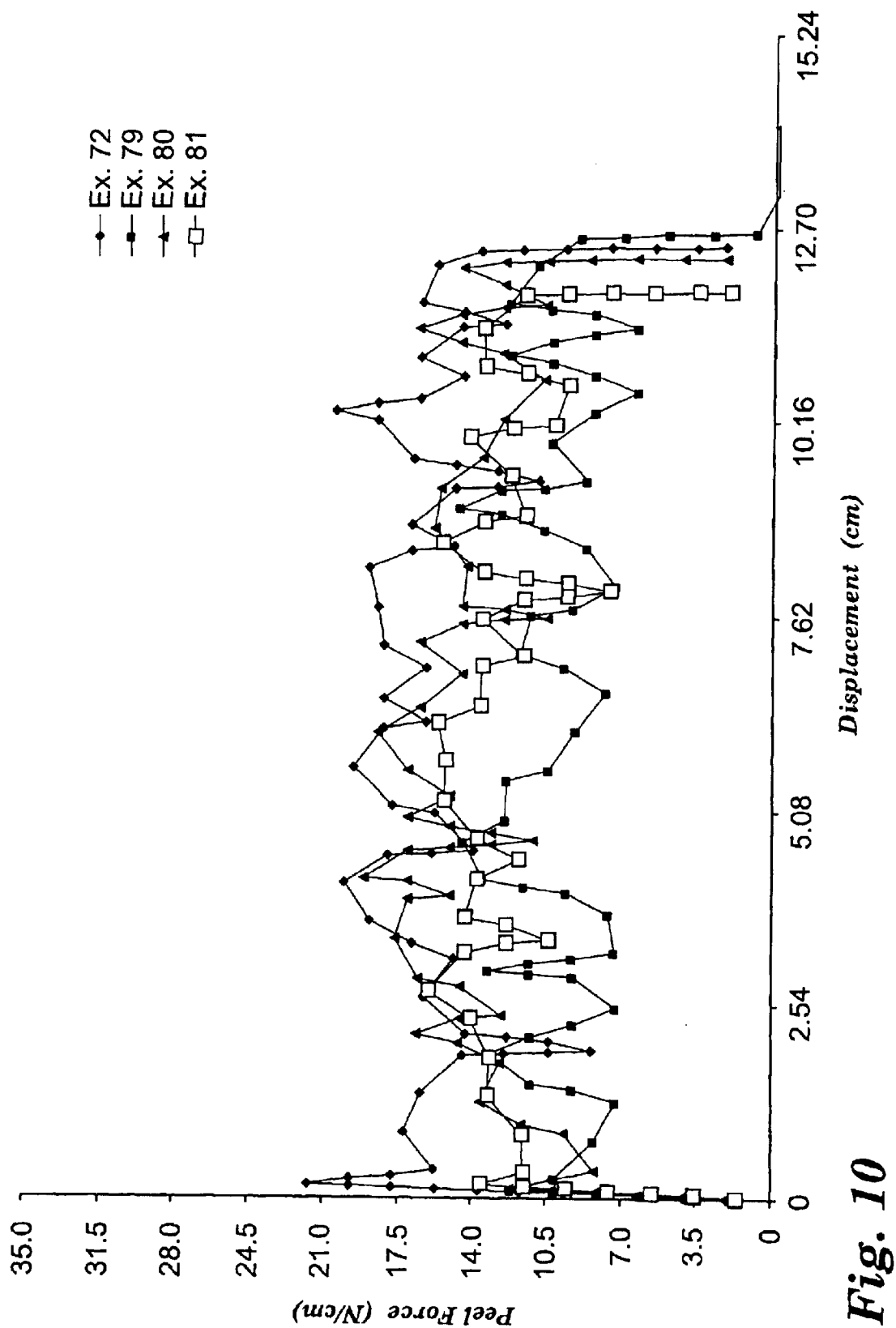
FIG. 10 is a plot showing the peel force applied in a direction (MD) parallel to the filament direction as a function of displacement for Examples 72, 79, 80 and 81.

Discussion of Table 3 and FIGS. 8–10

Table 3 displays a summary of the density, peel adhesion, static shear, and tensile/elongation results for Examples 72–84. Only uncrosslinked inclusion coextrusion samples were evaluated for static shear strength. Only crosslinked samples were evaluated for density, peel adhesion and tensile/elongation.

FIG. 8 shows the peel force as applied in a direction (MD) parallel to the filament direction as a function of displacement for Examples 73, 77 and 78. This Figure demonstrates that as the filament material increases from 0 to 20 wt % the peel adhesion remains essentially constant. FIG. 9 displays the peel force as applied in a direction (CD) perpendicular to the filament direction as a function of displacement for Examples 73, 77 and 78. Example 73 shows no structure, while Example 77 and 78 show dramatically different behavior that is characterized by a characteristic frequency and amplitude. The frequency between maxima in Examples 77 and 78 is exactly the distance between filaments, note that this period does not change with concentration. However, the amplitude between minima and maxima does change dramatically as the concentration of filament increases from 10 to 20%. Furthermore, the adhesion values in the CD direction is higher than in the MD. Thus by manipulation of the filament concentration and distance between the filaments one can design peel behavior with various qualities in both the direction parallel and perpendicular to the filament direction.

Figure 11:
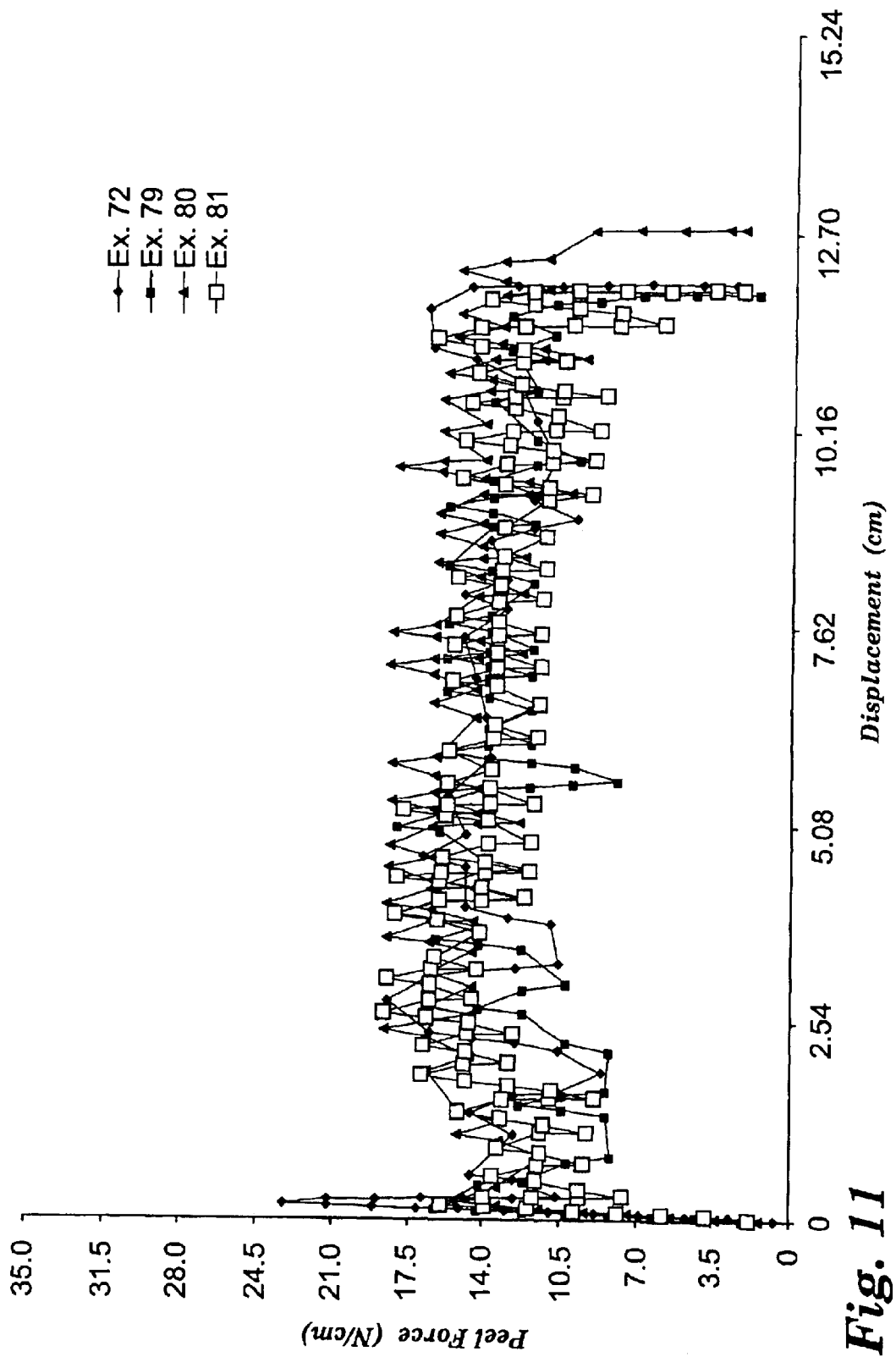
FIG. 11 is a plot showing the peel force applied in a direction (CD) perpendicular to the filament direction as a function of displacement for Examples 72, 79, 80 and 81.

FIG. 10 shows the peel force as applied in a direction (MD) parallel to the filament direction as a function of displacement for Examples 72, 79, 80 and 81. This Figure demonstrates that as the filament material increases from 0 to 30 wt % the peel adhesion is reduced slightly. FIG. 11 displays the peel force as applied in a direction (CD) perpendicular to the filament direction as a function of displacement for Examples 72, 79, 80 and 81. Example 72 shows no structure, while Example 79, 80 and 81 show dramatically different behavior that is characterized by a characteristic frequency and amplitude. The frequency between maxima in Examples 79, 80 and 81 is exactly the distance between filaments, note that this period does not change with concentration. However, in contrast to FIG. 9 the amplitude between maxima and minima of the force does not change as the filament concentration increases. Therefore, the filament type also plays a role in determining the characteristics of the peel force/displacement relationship. Not to be bound by theory, we believe that as the filament material characteristics become more dissimilar from the foam matrix the amplitude between maxima and minima increases.

Other unique properties not obtainable by a single component foam system but obtainable by the inclusion co-extrusion of embedded discrete structures may include, for example, hand tearable lengthwise along and between filaments, stretch releasable, enhanced tensile properties, tailored adhesion (see FIGS. 9 and 11 and the corresponding discussion).

Inclusion coextrusion of thermoplastic filaments in foam materials can dramatically increase the tensile force and elongation characteristics of the materials. These properties can be manipulated by choosing the optimum filament material & filament concentration to produce tensile properties that vary from high stress/low elongation to low stress/high elongation. The adhesion behavior in the direction both parallel and perpendicular to the filament direction can be manipulated by changing the filament material, filament spacing, and filament concentration.

Oriented Foam Examples 85–92

Single-layer (B) and three-layer (ABA) foam samples were prepared as in Example 1, above, except as noted below. The A layer is an unfoamed pressure sensitive adhesive skin layer formed using the Hot Melt Composition 10. The B layer is a foamed layer formed using the Hot Melt Composition 10, various thermoplastic polymer blend components, and various expandable microspheres available from Pierce Stevens, Buffalo, N.Y. The A layer was approximately 2.5 mils thick, and the B layer was approximately 40 mils thick. The extruder temperatures were set at 93.3° C., and the hose and die temperatures were set at 176.7° C. The thermoplastic blend components were added in various concentrations into zone 1, hot melt composition 10 was added in zone 3, and the expandable microspheres were was added into zone 9. The pressure sensitive adhesive material in the A layers was fed using a 2" Bonnot single screw extruder (SSE).

Both the A and B layers were pumped from the extruders to a multilayer feedblock using 0.5 inch (1.27 cm) OD flexible tubing. The A and B layers were combined into an ABA arrangement using a three layer Cloeren feedblock (Cloeren Company, Orange, Tex., Model: 96-1501) with an ABA selector plug. After the layers were combined in the feedblock the materials were formed into a planar sheet using a 10" (25.4 cm) wide Ultraflex 40 Die (Extrusion Dies Incorporated, Chippawa Falls, Wis.). The feedblock and die were both operated at temperatures of about 176° C. The ABA construction exited the die and was cast onto a temperature-controlled stainless steel casting drum maintained at 7° C. After cooling, the foam was transferred to a 0.127 mm thick polyethylene liner and collected on a film winder. Single layer foam constructions were made by disengaging the Bonnot SSE. The foam samples were uniaxially oriented at a ratio in the range of from 2.5:1 to 8:1 (i.e., stretched in the range of from 2.5 to 8 times its length) at room temperature.

Example 85 was prepared using the aforementioned conditions with a foam matrix consisting of 80 wt % Hot Melt Composition 1, 20 wt % Dow Engage 8200 and 4 pph of F100D. No adhesive skin layers (i.e., A layers) were present. The uncrosslinked foam samples were uniaxially oriented or stretched 2.5 times its original length (2.5:1 ratio) at room temperature.

Example 86 was prepared by following the procedure for Example 85 except that the composition of the foam matrix was 40 wt % Hot Melt Composition 1, 60 wt % Dow Engage 8200, and 4 pph F100D.

Example 87 was prepared using the aforementioned conditions with a foam matrix consisting of 25 wt % Hot Melt Composition 10, 75 wt % Shell Kraton D 1107, and 4 pph of F80SD. No adhesive skin layers were present. The uncrosslinked foam samples were uniaxially oriented at a ratio of 8:1 at room temperature.

Example 88 was prepared using the aforementioned conditions with a foam matrix consisting of 50 wt % Hot Melt Composition 10, 50 wt % DuPont Elvax 260, and 4 pph of F80SD. Adhesive skin layers of Hot Melt Composition 10 were present (ABA). The uncrosslinked foam samples were uniaxially oriented at a ratio of 2.8:1 at room temperature.

Example 89 was prepared by following the procedure for Example 88 except that the composition of the foam matrix was 50 wt % Hot Melt Composition 10, 50 wt % DuPont Elvax 260, and 6 pph of F80SD. These samples possessed minimal elongation and could not be oriented at room temperature.

Example 90 was prepared by following the procedure for Example 88 except that the composition of the foam matrix was 50 wt % Hot Melt Composition 10, 50 wt % DuPont Elvax 260, and 9 pph of F80SD. These samples possessed minimal elongation and could not be oriented at room temperature.

Example 91 was prepared using the aforementioned conditions with a foam matrix consisting of 50 wt % Hot Melt Composition 10, 50 wt % Shell Kraton D 1107, and 4 pph of F80SD. Adhesive skin layers of Hot Melt Composition 10 were present (ABA). The uncrosslinked foam samples were uniaxially oriented at a ratio of 6:1 at room temperature.

Example 92 was prepared by following the procedure for Example 91 except that the composition of the foam matrix was 50 wt % Hot Melt Composition 10, 50 wt % Shell Kraton D 1107, and 6 pph of F80SD. Adhesive skin layers of Hot Melt Composition 10 were present (ABA). The samples were uniaxially oriented at a ratio of 6:1 at room temperature.

TABLE 4

| Example # | Density, g/cm$^3$ | Orientation Type/Ratio | Post Density, g/cm3 |
|---|---|---|---|
| 85 | 0.5249 | LO-2.5:1 | 0.4518 |
| 86 | 0.523 | LO-2.5:1 | 0.33 |
| 87 | 0.3382 | LO-8:1 | 0.3489 |
| 88 | 0.3907 | LO-2.75:1 | 0.3605 |
| 89 | 0.3067 | Cannot Orient | — |
| 90 | 0.2231 | Cannot Orient | — |
| 91 | 0.3552 | LO-6:1 | 0.3835 |
| 92 | 0.2933 | LO-6:1 | 0.3136 |

Thermal Crosslinker Examples 93–96

In Example 93, 100 parts of the Hot melt composition 10 was mixed with 2 parts of F80 expandable microspheres and 5 parts of the crosslinking agent N,N,N',N tetrakis(2-hydroxyethyl) adipamide (available as Primid XL-552 from EMS Chemie) and extruded through a die, at a temperature lower than the activation temperature of the crosslinker, to a thickness of about 1 mm. The resulting foam had a slight amount of gel particles but did not inhibit the formation and extrusion of the foam. The foam was laminated to a silicone coated polyester release liner and cooled. A second silicone coated polyester release liner was laminated to the adhesive and the laminate was baked in an oven set at 177° C. for 30 minutes. After cooling, the samples were tested for 90° Peel Adhesion according to the test described above except that the samples were applied to a metal substrate coated with a DCT5002 automotive paint, and aging was changed as follows. Test results in Newtons/decimeter after aging are:

20 minutes at 22° C.—37.8 N/dm
3 days at 22° C.—90.0 N/dm
3 days at 100° C./100% humidity—186.3 N/dm
3 days at 70° C.—565 N/dm In Examples 94–96, the adhesives are prepared according to the procedure of Example 93 except that the cross-linking agents and compositions used are as follows:

In Example 94, 50.7 grams of Hot Melt Composition 10, 1.1 grams of F80 expandable microspheres, and 5 grams of diclycidyl ether of bisphenol A (available as Epon™828 from Shell Chemical Co.).

In Example 95, 39 grams of Hot Melt Composition 10, 0.8 grams of F80 expandable microspheres, 4 drops of a cycloaliphatic epoxy (available as SarCat K126 from Sartomer), 1 drop of tris-2,4,6-(dimethylaminomethyl) phenol (available as K-54 from Anchor Corp).

In Example 96, 39.2 grams of Hot Melt Composition 10, 0.8 grams of F80 expandable microspheres 0.1 gram of N,N,N',N tetrakis(2-hydroxyethyl)adipamide dissolved in 2 drops of water.

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof.

What is claimed is:

1. A foam article comprising a polymer foam, said polymer foam having at least one of its major surfaces smooth to an Ra value less than about 75 micrometers, as measured by laser triangulation profilometry, said polymer foam being smooth without being bonded to an additional layer, said polymer foam comprising a homogeneous distribution of a plurality or thermoplastic expandable polymeric microspheres, wherein said plurality of expandable polymeric microspheres are at least partially expanded.

2. The foam article according to claim 1, wherein said polymer foam has a center and a uniform size distribution of said at least partially expanded expandable polymeric microspheres from the major surfaces to the center of said polymer foam.

3. The foam article according to claim 1, wherein said plurality of expandable polymeric microspheres are at least mostly expanded.

4. The foam article according to claim 1, wherein said polymer foam has a pattern embossed on at least one major surface of said polymer foam.

5. The foam article according to claim 4, wherein said pattern is a microreplicated pattern and said polymer foam is not significantly crushed.

6. The foam article according to claim 1, wherein said polymer foam is substantially free of broken polymeric microspheres.

7. The foam article according to claim 1, wherein said foam article is a pressure sensitive adhesive article or a heat-activated adhesive article.

8. The foam article according to claim 1, wherein said polymer foam is an adhesive.

9. The foam article according to claim 1, wherein the foam article is one from the group consisting of gaskets, gap-sealing articles, vibration damping articles, tape backings, retroreflective sheet backings, anti-fatigue mats, abrasive article backings, raised pavement marker adhesive pads, medical dressings, and sealant articles.

10. The foam article according to claim 1, wherein said polymer foam is stretched in at least one direction.

11. The foam article according to claim 10, wherein said polymer foam has a matrix and contains microvoids between said matrix and said expandable microspheres.

12. The foam article according to claim 1, wherein said polymer foam is crosslinked.

13. The foam article according to claim 1, wherein said foam article comprises at least one other polymer composition in the form of at least one discrete structure bonded to or embedded in said foam.

14. The foam article according to claim 13, wherein said at least one discrete structure is a plurality of discrete structures, and said polymer foam comprises an adhesive composition.

15. The foam article according to claim 1, further comprising a first substrate, wherein said polymer foam is on a major surface of said substrate and said foam article is a multi-layer article.

16. The foam article according to claim 15, further comprising a second substrate having a major surface, wherein said polymer foam is sandwiched between said first and second substrates.

17. The foam article according to claim 1, wherein said polymer foam comprises an agent selected from the group consisting of tackifiers, plasticizers, pigments, dyes, solid fillers, non-expandable microspheres, blowing agents and combinations thereof.

18. The foam article according to claim 1, wherein said polymer foam comprises an acrylic foam.

19. The foam article according to claim i, wherein said polymer foam comprises a matrix comprising a blend of two or more polymers wherein at least one of said polymers in said blend comprises a pressure sensitive adhesive polymer and at least one of said polymers is selected from the group consisting of unsaturated thermoplastic elastomers, acrylate monomer-insoluble saturated thermoplastic elastomers, and non-pressure sensitive adhesive thermoplastic polymers.

20. The foam article according to claim 1, wherein said foam article comprises a polymer composition bonded to said polymer foam.

21. The foam article according to claim 1, wherein said foam article comprises a plurality of polymer compositions bonded to said polymer foam.

22. The foam article according to claim 1, wherein said article comprises an adhesive composition bonded to at least one major surface of said polymer foam.

23. The foam article according to claim 1, wherein said polymer foam comprises a polymer matrix comprising a blend of two or more polymers wherein at least one of said polymers in said blend comprises a pressure sensitive adhesive polymer and at least one of said polymers is an acrylate-insoluble semicrystalline polymer.

24. The foam article according to claim 1, wherein the polymer foam is capable of stretch activated release.

25. The foam article according to claim 1, further comprising at least one layer comprising a polymer composition, said layer bonded to said polymer foam.

26. The foam article according to claim 25, wherein the polymer composition comprises an acrylic polymer.

* * * * *

UNITED STATES PATENT AND TRADEMARK OFFICE
CERTIFICATE OF CORRECTION

PATENT NO. : 6,797,371 B1
DATED : September 28, 2004
INVENTOR(S) : Gehlsen, Mark D.

It is certified that error appears in the above-identified patent and that said Letters Patent is hereby corrected as shown below:

Column 3,
Line 11, delete "10" after "layers".

Column 8,
Line 25, delete "OSO$_4$" and insert in place thereof -- O$_S$O$_4$ --.
Line 42, delete "actylate" and insert in place thereof -- acrylate --.
Line 56, delete "isobomyl" and insert in place thereof -- isobornyl --.

Column 13,
Line 47, delete "extrudablc" and insert in place thereof -- extrudable --.

Column 22,
Line 61, delete "(Dynapol$^{TM}$ 157)" and insert in place thereof -- (Dynapol$^{TM}$ 1157) --.

Column 23,
Line 44, delete "kg/m$^3$)," and insert in place thereof -- kg/m$^3$). --.

Column 24,
Line 29, delete "Nonmag" and insert in place thereof -- Normag --.

Column 25,
Line 27, delete "*443" and insert in place thereof -- *448 --.
Line 29, delete "*453.5" and insert in place thereof -- *458.5 --.
Line 34, delete "*433" and inser tin place thereof -- *483 --.

Column 28,
Line 38, delete "(0.001 in)" and insert in place thereof -- (0100 in) --.

Column 33,
Line 5, delete "or" and insert in place thereof -- of --.

UNITED STATES PATENT AND TRADEMARK OFFICE
CERTIFICATE OF CORRECTION

PATENT NO. : 6,797,371 B1
DATED : September 28, 2004
INVENTOR(S) : Gehlsen, Mark D.

It is certified that error appears in the above-identified patent and that said Letters Patent is hereby corrected as shown below:

Column 34,
Line 16, delete "claim i" and insert in place thereof -- claim 1 --.

Signed and Sealed this

First Day of February, 2005

JON W. DUDAS
*Director of the United States Patent and Trademark Office*